United States Patent
Oyama et al.

(10) Patent No.: US 12,046,140 B2
(45) Date of Patent: Jul. 23, 2024

(54) MOBILITY INFORMATION PROVISION SYSTEM, SERVER, AND VEHICLE

(71) Applicant: SUBARU CORPORATION, Tokyo (JP)

(72) Inventors: Hajime Oyama, Tokyo (JP); Ryosuke Namba, Tokyo (JP); Masato Mizoguchi, Tokyo (JP); Tomoyuki Kitamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 164 days.

(21) Appl. No.: 17/135,111

(22) Filed: Dec. 28, 2020

(65) Prior Publication Data

US 2021/0201682 A1 Jul. 1, 2021

(30) Foreign Application Priority Data

Dec. 30, 2019 (JP) .................................. 2019-240029
Dec. 30, 2019 (JP) .................................. 2019-240030
(Continued)

(51) Int. Cl.
*G08G 1/16* (2006.01)
*G05D 1/00* (2024.01)
*G08G 1/01* (2006.01)

(52) U.S. Cl.
CPC ............. *G08G 1/16* (2013.01); *G05D 1/0287* (2013.01); *G08G 1/0112* (2013.01); *G08G 1/164* (2013.01); *G08G 1/166* (2013.01)

(58) Field of Classification Search
CPC ...... G05D 1/0287; G08G 1/16; G08G 1/0112; G08G 1/164; G08G 1/166; G08G 1/0145; G08G 1/096725; G08G 1/096775
See application file for complete search history.

(56) References Cited

U.S. PATENT DOCUMENTS 9,595,196 B1  3/2017 Hiranaka
10,255,811 B2 * 4/2019 Naka .................... G01S 13/931
(Continued)

FOREIGN PATENT DOCUMENTS

EP  3 543 864 A1  9/2019
JP  2002-279591 A  9/2002
(Continued)

OTHER PUBLICATIONS

"Lane" Definition from Wikipedia, Accessed Apr. 5, 2023.*
(Continued)

*Primary Examiner* — Jason Holloway
*Assistant Examiner* — Blake A Wood
(74) *Attorney, Agent, or Firm* — Rimon P.C.

(57) ABSTRACT

A mobility information provision system includes a collector, a mapping unit, a generator, and a controller. The collector collects field information on movement of mobile bodies using communication apparatuses provided in respective predetermined zones or respective predetermined sections. The mapping unit maps positions of the mobile bodies based on the collected field information. The generator generates course-related information based on information on the mapped positions of the mobile bodies. The controller is provided for each of the mobile bodies and controls movement of corresponding one of the mobile bodies based on the course-related information. If the collected field information includes information on an obstacle that would hinder the movement of the mobile bodies, the mapping unit maps the obstacle together with the positions of the mobile bodies, and the generator generates the course-related information for the mobile bodies to cause the mobile bodies to move avoiding the obstacle.

19 Claims, 16 Drawing Sheets

(30) Foreign Application Priority Data

Dec. 30, 2019 (JP) ................................ 2019-240031
Sep. 11, 2020 (JP) ................................ 2020-152494

(56) References Cited

U.S. PATENT DOCUMENTS

| | | | |
|---|---|---|---|
| 10,466,717 B1* | 11/2019 | Su | G06N 3/045 |
| 2007/0142037 A1* | 6/2007 | O'Toole | G08G 1/09675 |
| | | | 455/414.1 |
| 2007/0216528 A1* | 9/2007 | Sanma | G08G 1/161 |
| | | | 370/518 |
| 2008/0303696 A1 | 12/2008 | Aso et al. | |
| 2011/0054716 A1 | 3/2011 | Stahlin et al. | |
| 2013/0325311 A1 | 12/2013 | Yoo et al. | |
| 2015/0241880 A1* | 8/2015 | Kim | G05D 1/0055 |
| | | | 701/25 |
| 2016/0055745 A1* | 2/2016 | Karacan | H04W 4/80 |
| | | | 701/117 |
| 2017/0259820 A1 | 9/2017 | Takahashi | |
| 2017/0371349 A1 | 12/2017 | Kim et al. | |
| 2018/0025634 A1 | 1/2018 | Ujiie et al. | |
| 2018/0141461 A1 | 5/2018 | Sano | |
| 2018/0154899 A1* | 6/2018 | Tiwari | B60W 10/20 |
| 2018/0273032 A1 | 9/2018 | Yang et al. | |
| 2018/0299285 A1 | 10/2018 | Morita | |
| 2018/0299884 A1 | 10/2018 | Morita | |
| 2019/0028862 A1* | 1/2019 | Futaki | H04W 4/44 |
| 2019/0106118 A1 | 4/2019 | Asakura et al. | |
| 2019/0287401 A1 | 9/2019 | Aoude et al. | |
| 2019/0317507 A1 | 10/2019 | Zhang et al. | |
| 2019/0364492 A1 | 11/2019 | Azizi et al. | |
| 2019/0384319 A1 | 12/2019 | Sakagami et al. | |
| 2020/0005644 A1 | 1/2020 | Ichimaru et al. | |
| 2020/0008028 A1 | 1/2020 | Yang | |
| 2020/0166945 A1 | 5/2020 | Kim et al. | |
| 2020/0183389 A1 | 6/2020 | Kim et al. | |
| 2020/0256681 A1 | 8/2020 | Kim et al. | |
| 2020/0349850 A1 | 11/2020 | Park et al. | |
| 2020/0394918 A1 | 12/2020 | Chen | |
| 2021/0031760 A1 | 2/2021 | Ostafew et al. | |
| 2021/0046936 A1* | 2/2021 | Umeda | B60W 10/20 |
| 2021/0053566 A1 | 2/2021 | Kobayashi et al. | |
| 2021/0095975 A1 | 4/2021 | Mubarek et al. | |
| 2021/0122373 A1* | 4/2021 | Dax | G08G 1/166 |
| 2022/0221550 A1 | 7/2022 | Haga et al. | |

FOREIGN PATENT DOCUMENTS

| | | |
|---|---|---|
| JP | 2005-182198 A | 7/2005 |
| JP | 2005-228111 A | 8/2005 |
| JP | 2005-238992 A | 9/2005 |
| JP | 2005-293032 A | 10/2005 |
| JP | 2007-299193 A | 11/2007 |
| JP | 2007-323117 A | 12/2007 |
| JP | 2008-204004 A | 9/2008 |
| JP | 2008-262418 A | 10/2008 |
| JP | 2008-305014 A | 12/2008 |
| JP | 2009-168458 A | 7/2009 |
| JP | 2010-137803 A | 6/2010 |
| JP | 2011-209883 A | 10/2011 |
| JP | 2012-168243 A | 9/2012 |
| JP | 2015-161977 A | 9/2015 |
| JP | 2017-117328 A | 6/2017 |
| JP | 2018-097540 A | 6/2018 |
| JP | 2018-138406 A | 9/2018 |
| JP | 2018-142334 A | 9/2018 |
| JP | 2018-199357 A | 12/2018 |
| JP | 2019-504301 A | 2/2019 |
| JP | 2019-046034 A | 3/2019 |
| JP | 2019-106674 A | 6/2019 |
| JP | 2019-125304 A | 7/2019 |
| JP | 2019-174304 A | 10/2019 |
| JP | 2019-182412 A | 10/2019 |
| JP | 2019-185366 A | 10/2019 |
| JP | 2019-204241 A | 11/2019 |
| JP | 2019-212095 A | 12/2019 |
| JP | 2019-215626 A | 12/2019 |
| JP | 2019-215775 A | 12/2019 |
| JP | 2021-111337 A | 8/2021 |
| JP | 2021-111339 A | 8/2021 |
| WO | 2015-182202 A1 | 12/2015 |
| WO | 2016/038931 A1 | 3/2016 |
| WO | 2016039489 A1 | 3/2016 |
| WO | 2016/143113 A1 | 9/2016 |
| WO | 2017/111126 A1 | 6/2017 |
| WO | 2017-111139 A1 | 6/2017 |
| WO | 2017/179193 A1 | 10/2017 |
| WO | 2018/146882 A1 | 8/2018 |
| WO | 2019-022201 A1 | 1/2019 |
| WO | 2019/031853 A1 | 2/2019 |
| WO | 2019-142275 A1 | 7/2019 |
| WO | 2019/165737 A1 | 9/2019 |
| WO | 2019-245049 A1 | 12/2019 |

OTHER PUBLICATIONS

Extended European Search Report issued in corresponding European Patent Application No. 20217529.5-1001, dated Dec. 15, 2021.
European Office Action issued in corresponding European Patent Application No. 20217640.0-1213, dated Jan. 23, 2023.
U.S. Non-Final Office Action issued in related U.S. Appl. No. 17/135,382, mailed Feb. 2, 2023.
U.S. PTO Final Office Action issued in related U.S. Appl. No. 17/118,205, mailed May 25, 2023.
U.S. PTO Non-Final Office Action issued in related U.S. Appl. No. 17/135,248, dated Apr. 17, 2023.
U.S. PTO Notice of Allowance issued in related U.S. Appl. No. 17/135,361, dated Mar. 29, 2023.
U.S. PTO Final Office Action issued in related U.S. Appl. No. 17/135,284, dated Apr. 26, 2023.
U.S. PTO Final Office Action issued in related U.S. Appl. No. 17/135,329, dated Apr. 26, 2023.
Notice of Reasons for Refusal received in corresponding Japanese Patent Application No. 2020-145303, dated Feb. 20, 2024.
Notice of Reasons for Refusal received in corresponding Japanese Patent Application No. 2020-152493, dated Feb. 20, 2024.
Notice of Reasons for Refusal received in corresponding Japanese Patent Application No. 2020-145304, dated Feb. 27, 2024.
Notice of Reasons for Refusal received in corresponding Japanese Patent Application No. 2020-145305, dated Feb. 27, 2024.
Notice of Reasons for Refusal received in corresponding Japanese Patent Application No. 2020-152492, dated Feb. 27, 2024.
Notice of Reasons for Refusal received in corresponding Japanese Patent Application No. 2020-152494, dated Feb. 27, 2024.
Notice of Reasons for Refusal received in corresponding Japanese Patent Application No. 2020-152495, dated Feb. 27, 2024.
Notice of Reasons for Refusal received in corresponding Japanese Patent Application No. 2020-165514, dated Mar. 5, 2024.
Notice of Reasons for Refusal received in corresponding Japanese Patent Application No. 2020-165515 dated Mar. 12, 2024, w/ English Translation.
Notice of Reasons for Refusal received in corresponding Japanese Patent Application No. 2020-149506 dated Mar. 26, 2024, w/ English Translation.
Notice of Reasons for Refusal received in corresponding Japanese Patent Application No. 2020-165509 dated Mar. 19, 2024, w/ English Translation.
Notice of Reasons for Refusal received in corresponding Japanese Patent Application No. 2020-165512 dated Mar. 12, 2024, w/ English Translation.
Notice of Reasons for Refusal received in corresponding Japanese Patent Application No. 2020-153694 on Apr. 2, 2024.
Notice of Reasons for Refusal received in corresponding Japanese Patent Application No. 2020-165513, dated Apr. 30, 2024.
Notice of Reasons for Refusal received in corresponding Japanese Patent Application No. 2020-165510, dated Apr. 30, 2024.

* cited by examiner

MOBILITY INFORMATION PROVISION SYSTEM, SERVER, AND VEHICLE

CROSS-REFERENCE TO RELATED APPLICATIONS

The present application claims priority from Japanese Patent Application Nos. 2019-240029 filed on Dec. 30, 2019, 2019-240030 filed on Dec. 30, 2019, 2019-240031 filed on Dec. 30, 2019, and 2020-152494 filed on Sep. 11, 2020, the entire contents of each of which are hereby incorporated by reference.

BACKGROUND

The technology relates to a mobility information provision system, a server, and a vehicle.

An automatic driving technique has been developed for traveling of a vehicle, such as an automobile, to a destination. Reference is made to Japanese Unexamined Patent Application Publication No. 2019-212095.

The vehicle travels along a route to the destination, for example. During the travel, it is desired that the vehicle use a sensor, such as a camera, provided in the own vehicle to capture images of surroundings of the vehicle, for example, and travel safely by avoiding contact with a mobile body such as another vehicle.

SUMMARY

An aspect of the technology provides a mobility information provision system including a collector, a mapping unit, a generator, and a controller. The collector is configured to collect field information or preliminary processed information using a plurality of communication apparatuses provided in respective predetermined zones or respective predetermined sections. The field information includes information on movement of a plurality of mobile bodies, and the preliminary processed information is obtained by processing the field information. The mapping unit is configured to map positions of the mobile bodies on the basis of the field information or the preliminary processed information collected by the collector. The generator is configured to generate course-related information on the basis of information on the positions of the mobile bodies mapped by the mapping unit. The course-related information is information on courses or movable ranges in which the mobile bodies are movable. The controller is provided for each of the mobile bodies and configured to control movement of corresponding one of the mobile bodies on the basis of the course-related information generated by the generator, information obtained from the course-related information and used to determine the movement of the corresponding one of the mobile bodies, or information used to control the movement of the corresponding one of the mobile bodies. In a case where the field information or the preliminary processed information collected by the collector includes information on an obstacle that would hinder the movement of the mobile bodies, the mapping unit is configured to map the obstacle together with the positions of the mobile bodies, and the generator is configured to generate the course-related information for each of the mobile bodies to cause the mobile bodies to move avoiding the obstacle.

An aspect of the technology provides a server for a mobility information provision system. The mobility information provision system includes a collector, a mapping unit, a generator, and a controller. The collector is configured to collect field information or preliminary processed information using a plurality of communication apparatuses provided in respective predetermined zones or respective predetermined sections. The field information includes information on movement of a plurality of mobile bodies, and the preliminary processed information is obtained by processing the field information. The mapping unit is configured to map positions of the mobile bodies on the basis of the field information or the preliminary processed information collected by the collector. The generator is configured to generate course-related information on the basis of information on the positions of the mobile bodies mapped by the mapping unit. The course-related information is information on courses or movable ranges in which the mobile bodies are movable. The controller is provided for each of the mobile bodies and configured to control movement of corresponding one of the mobile bodies on the basis of the course-related information generated by the generator, information obtained from the course-related information and used to determine the movement of the corresponding one of the mobile bodies, or information used to control the movement of the corresponding one of the mobile bodies. The server includes at least the collector out of the collector, the mapping unit, and the generator. In a case where the field information or the preliminary processed information collected by the collector includes information on an obstacle that would hinder the movement of the mobile bodies, the mapping unit is configured to map the obstacle together with the positions of the mobile bodies, and the generator is configured to generate the course-related information for each of the mobile bodies to cause the mobile bodies to move avoiding the obstacle.

An aspect of the technology provides a vehicle for a mobility information provision system. The mobility information provision system includes a collector, a mapping unit, a generator, and a controller. The collector is configured to collect field information or preliminary processed information using a plurality of communication apparatuses provided in respective predetermined zones or respective predetermined sections. The field information includes information on movement of a plurality of mobile bodies, and the preliminary processed information is obtained by processing the field information. The mapping unit is configured to map positions of the mobile bodies on the basis of the field information or the preliminary processed information collected by the collector. The generator is configured to generate course-related information on the basis of information on the positions of the mobile bodies mapped by the mapping unit. The course-related information is information on courses or movable ranges in which the mobile bodies are movable. The controller is provided for each of the mobile bodies and configured to control movement of corresponding one of the mobile bodies on the basis of the course-related information generated by the generator, information obtained from the course-related information and used to determine the movement of the corresponding one of the mobile bodies, or information used to control the movement of the corresponding one of the mobile bodies. The vehicle includes at least the controller, out of the collector, the mapping unit, the generator, and the controller. In a case where the field information or the preliminary processed information collected by the collector includes information on an obstacle that would hinder the movement of the mobile bodies, the mapping unit is configured to map the obstacle together with the positions of the mobile bodies, and the generator is configured to generate the course-related information for each of the mobile bodies to cause the mobile bodies to move avoiding the obstacle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Achievement of automatic driving, for example, of a mobile body, such as a vehicle, is expected to enable the mobile body to move to a destination regardless of an intention of a user, or to assist a driving operation performed by the user to enhance safety of movement.

However, in a situation in which individual mobile bodies such as vehicles independently execute detection and control, it is not necessarily possible to accurately sense movement of another mobile body.

For example, unpredicted movement of another mobile body, another mobile body stopped at a blind spot, and another mobile body coming out from a blind spot can make it necessary for the mobile body, such as a vehicle, to execute abrupt traveling control, for example, to avoid contact with these other mobile bodies.

Achieving a mobility information provision system that provides a vehicle with information on other mobile bodies can be one possible solution to determine or control the travel of the vehicle such as an automobile. For example, the mobility information provision system collects information on movement of a plurality of mobile bodies using a server, and gives each of the mobile bodies an instruction to move in safety while avoiding a collision between the mobile bodies on the basis of the collected information.

However, such collection of information on the movement of the mobile bodies does not always ensure appropriate and safety driving.

In some cases, an obstacle, such as a fallen object, is lying on an actual road, for example.

In such a case, the vehicle, such as an automobile, is not necessarily allowed to move in safety in spite of the instruction based on the collected information from the mobility information provision system.

It is desirable to provide a mobility information provision system, a server, and a vehicle that allow a mobile body to move while ensuring safety in accordance with the situation.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Example Embodiment

Figure 1:
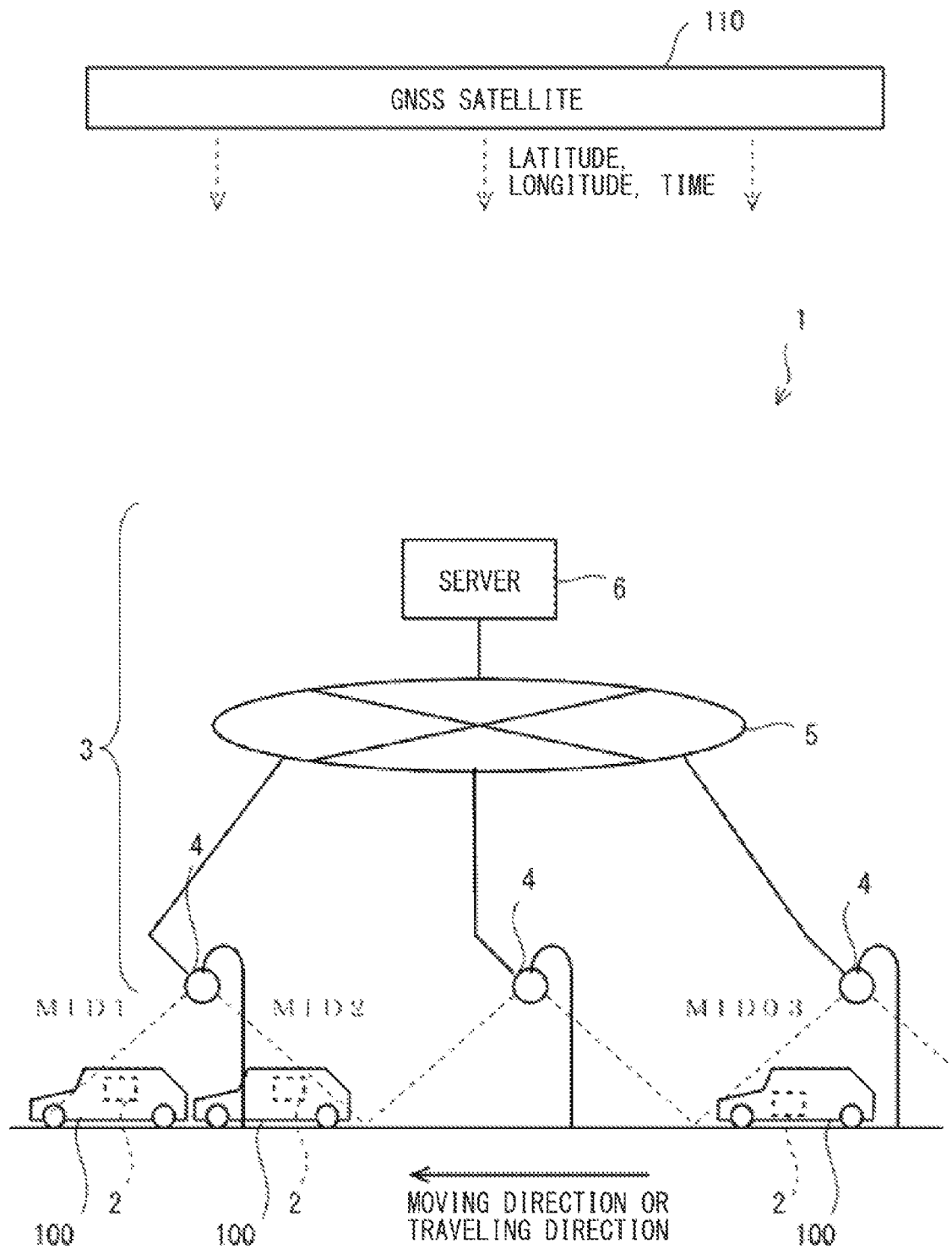
FIG. 1 is a configuration diagram illustrating a mobility information provision system for mobile bodies according to one example embodiment of the technology.

FIG. 1 is a configuration diagram illustrating a mobility information provision system 1 for mobile bodies according to first example embodiment of the technology.

The mobility information provision system 1 illustrated in FIG. 1 may include a plurality of terminal devices 2 and a plurality of wireless base stations 4. The respective terminal devices 2 are usable in a plurality of vehicles 100 that travel on a road. The vehicles 100 may serve as a plurality of mobile bodies. The wireless base stations 4 may serve as a plurality of communication apparatuses. The wireless base stations 4 may be provided along the road on which the vehicles 100 travel.

FIG. 1 also illustrates one of global navigation satellite system (GNSS) satellites 110. The GNSS satellite 110 may emit a radio wave toward the Earth's surface. The radio wave may include information on a latitude and a longitude, indicating a position of each of the satellites, superimposed on information on an absolute time synchronized among the satellites. The terminal device 2 and a server 6 may receive radio waves of the GNSS satellites 110, and thereby generate information on a latitude and a longitude indicating a position of a point where the radio waves have been received. The server 6 will be described later. On the basis of a distance determinable from the generated latitude and longitude and the latitudes and the longitudes of the satellites, it is possible to calculate time taken for the radio waves to reach the reception point. This makes it possible to obtain, in regard to the reception point, an accurate time based on the time of the GNSS satellite 110.

Examples of the mobile body may include, in addition to the vehicle 100, a pedestrian, a bicycle, a motorcycle, and a cart. The terminal device 2 may be provided for these mobile bodies. The terminal device 2 may be provided fixedly or detachably in the vehicle 100, for example.

Another vehicle 100 may travel on the road provided with the wireless base stations 4. Example of the other vehicle 100 may include the other vehicle 100 not provided with information from the mobility information provision system 1 illustrated in FIG. 1, and the other vehicle 100 provided with another piece of information from another mobility information provision system. The vehicle 100 and other mobile bodies may not be configured to travel on a fixed track, unlike a train, for example. It is possible for the vehicle 100 and other mobile bodies to move while freely and independently changing their traveling directions and traveling speeds. The mobility information provision system 1 may be configured to, instead of providing mobility information to all these mobile bodies, provide mobility information to a limited number of mobile bodies out of the mobile bodies.

The wireless base stations 4 may be coupled to a dedicated network 5 provided for the mobility information provision system 1. The server 6 may further be coupled to the dedicated network 5.

The server 6 may be coupled to the terminal devices 2 via the dedicated network 5. The wireless base stations 4, the dedicated network 5, and the server 6 may configure a system 3 on the base station side. The system 3 may provide mobility information to mobile bodies. The wireless base stations 4 may be arranged for respective sections along a single road. In this case, each of the wireless base stations 4 may be configured to provide information to the terminal device 2 used in the mobile body moving in the section of which the wireless base station 4 is in charge. Alternatively, the wireless base stations 4 may be provided for respective areas. The area may be wider than the single road. In this case, each of the wireless base stations 4 may be configured to provide information to the terminal device 2 used in the mobile body moving in the area of which the wireless base station 4 is in charge.

In some example embodiments, an "area" may refer to a place defined as a planar space. The "area" may be a zone.

In some example embodiments, a "section" may refer to a span from a certain point to the next point. The "section" may include a concept of time.

The dedicated network 5 may be provided for the mobility information provision system 1. The dedicated network 5 may be a private closed network. The dedicated network 5 may be provided to be dedicated for a section of a certain road or an area of a certain region, but may be any network as long as it limits usage by imposing specific conditions, such as a specific system or section. In contrast, the Internet may be a public, open wide-area communication network. Examples of the wide-area communication network may include, in addition to the Internet, a dedicated communication network to be used in an advanced traffic system such as advanced driver-assistance systems (ADAS), and an ATM switched network to be dedicated for telephone exchange. The mobility information provision system 1 may use any of these wide-area communication networks, in place of or together with the dedicated network 5. On an open network, transmission delay tends to be longer than on a closed network. Performing coding such as encryption on data enables a certain degree of confidentiality to be secured on an open network. However, using the dedicated network 5 makes it possible to execute low-delay, large-capacity high-speed communication mutually stably as data communication between the wireless base stations 4 and the server 6, as compared with a case of using the Internet, for example. Even if the dedicated network 5 is, for example, configured to transmit and receive information via asynchronous frames based on Transmission Control Protocol/Internet Protocol (TCP/IP), and is configured to retransmit frames in response to collision detection, transmission delay due to such transmission is unlikely to be too long. On the dedicated network 5, it is possible to keep transmission delay short, as compared with the Internet on which a large amount of data is transmitted and received asynchronously in some cases.

It is to be noted that two or more servers 6 may be provided for a communication network including the dedicated network 5 or the Internet. The servers 6 may be provided to be distributed between allocated regions such as roads or areas. Alternatively, the servers 6 may be provided to be distributed downstream and upstream. The downstream server may directly communicate with the wireless base stations 4. The upstream server may be provided upstream of the downstream server. The servers 6 may be provided to be distributed between two or more groups into which the terminal devices 2 are separated. In any case, cooperative operation of the two or more servers 6 makes it is possible to reduce processing load of each of the servers 6. Moreover, appropriately distributing and disposing the servers 6 on the communication network makes it possible to reduce an amount of transmitted information on each part and the whole of the communication network.

In the mobility information provision system 1 described above, the terminal devices 2 of the vehicles 100 and the server 6 may transmit and receive data to and from each other, by data packet routing control on the communication network including the dedicated network 5 and the wireless base stations 4. If the terminal device 2 moves together with the vehicle 100, and the wireless base station 4 in charge of an area accommodating the terminal device 2 changes, the wireless base stations 4 and the server 6 may switch the routing. The server 6 may thus communicate with the terminal device 2 via the wireless base station 4 in charge of an area that newly accommodates the moving vehicle 100. The wireless base stations 4 before and after the switching may transmit and receive information related to the moving vehicle 100 and the terminal device 2 to and from each other.

It is to be noted that the terminal devices 2 may be accommodated in the area or an wireless coverage of the wireless base stations 4. The information may be transmitted and received as far as the terminal devices 2 is located in at least one of wireless coverages of the wireless base stations 4 provided in the respective areas.

By such communication, the server 6 may collect field information related to traveling of the vehicles 100. The field information to be collected may include information about a mobile body other than the vehicle 100, for example. On the basis of the collected field information, the server 6 may generate, for example, information on a course or a movable range in a short section for each of the vehicles 100. In one embodiment, the information on the course or the movable range may serve as "course-related information". The courses or the movable ranges may allow the vehicles 100 to travel therewithin safely without colliding with each other, for example. The server 6 may repeatedly transmit the generated information, as primary processed information, to the terminal devices 2 of the vehicles 100 every predetermined period. The server 6 may organize the collected field information itself for each of the vehicles 100, for example, and repeatedly transmit the organized field information to the terminal devices 2 of the vehicles 100 every predetermined period.

In a case where only one vehicle 100 corresponds to a predetermined zone and/or a predetermined section of which the wireless base station 4 is in charge, the wireless base station 4 may take charge of only the one vehicle 100. In that case, the server 6 may generate the primary processed information on the basis of a map collected in advance and field information of the one vehicle 100. Communication may be performed only once in a period of time in which the vehicle 100 passes through the predetermined zone and/or the predetermined section of which the wireless base station 4 is in charge.

In some example embodiments, a "short section" may refer to a section in the traveling direction (front, rear, left, right) of the vehicle 100 that undergoes control or assist. The "short section" may be defined as, for example, a distance to be traveled in 200 milliseconds at a speed of 60 km per hour.

The term "in charge of" may refer to a state in which the wireless base station 4 is able to communicate with a device in the corresponding area.

By such communication, the terminal device 2 provided in the vehicle 100 may repeatedly receive, every predetermined period from the wireless base station 4 in charge of an area accommodating the terminal device 2, the primary processed information or the field information transmitted by the server 6. On the basis of the information received by the terminal device 2, the vehicle 100 may execute control for the movement of the vehicle 100. In a case of automatic driving, the vehicle 100 may determine a course for the automatic driving, and cause the own vehicle to travel in accordance with the course. In a case of driving assist of manual driving, the vehicle 100 may adjust a driving operation performed by a user riding therein to prevent the own vehicle from deviating greatly from the determined course, and cause the own vehicle to travel. It is possible for the vehicle 100 to travel along the determined course. It is to be noted that the vehicle 100 may notify the riding user of the information received by the terminal device 2 or information based on the received information by, for example, display or sound output.

The field information to be collected by the base station side, such as the server 6, may be information related to the movement of mobile bodies such as the vehicles 100. Examples of the field information may include information to be collected from each of the vehicles 100, monitoring information of a road, and traffic information of a region based on the monitoring information. Examples of the information to be collected from each of the vehicles 100 may include traveling information of the vehicle 100, occupant information related to the user, peripheral information of the vehicle 100, traffic information of a region. Examples of the traveling information of the vehicle 100 may include, in addition to the traveling direction and the traveling speed, a current location, a destination, and an attitude or movement of a vehicle body of the vehicle 100. Examples of the attitude of the vehicle body may include a yaw rate.

The primary processed information to be transmitted by the base station side, such as the server 6, to the terminal device 2 of each of the vehicles 100 may be, for example, information usable by each of the vehicles 100 for control or determination of the traveling of the vehicle 100. Examples of the primary processed information may include the traveling direction and the traveling speed in a short section of the vehicle 100. Information to be transmitted by the server 6 to the terminal device 2 of each of the vehicles 100 may include, for example, information on an estimated current location of the vehicle 100, a maximum movable distance or a maximum movable range from the estimated current location of the vehicle 100, and information on an estimated current time. The terminal device 2 may keep receiving these pieces of information repeatedly every short, predetermined period. This enables the vehicle 100 to keep traveling with safety ensured on the basis of the information. The vehicle 100 may repeatedly acquire information for each short section every predetermined period, and travel in accordance with the information. This enables the vehicle 100 to travel safely to a desired destination, for example.

In existing techniques, the vehicle 100 sets a route to a destination, for example, in a navigation device, and a user him/herself performs a driving operation while ensuring safety in accordance with guidance of the route, which enables the vehicle 100 to move safely to the destination. During the movement, the vehicle 100 having a driving assist function is able to use a sensor, such as a camera, provided in the vehicle 100 to capture an image of the interior or exterior of the vehicle, and adjust a course to avoid contact with a mobile body such as the other vehicle 100 to assist driving.

However, in such autonomous automatic driving or driving assist, it is not necessarily possible to accurately predict and sense the movement of the other vehicle 100, for example.

For example, the other vehicle 100 operated by a user can make unpredicted movement, such as changing a course abruptly. Another mobile body can run out into a course, or the other vehicle 100 can be parked around a corner that is out of sight. For example, bad weather such as snowstorm can cause viewability to decrease. In a weather such as snowstorm, it can be difficult to visually recognize an oncoming vehicle. At an intersection or a merging point of an exit of a highway, the other vehicle 100 can approach from a lateral direction or a diagonal rear direction. In these cases, it is necessary for the own vehicle during automatic driving to execute abrupt traveling control to avoid contact with the other vehicle 100 to, for example, prevent the own vehicle from coming into contact with the other vehicle 100 whose traveling changes abruptly, or from hindering a course of the other vehicle 100. It is desired that such events be avoided for prevention of an accident. In a case of controlling the movement of a mobile body such as the vehicle 100, it is desired that the movement be less likely to be influenced by unpredicted movement of another mobile body.

Figure 2:
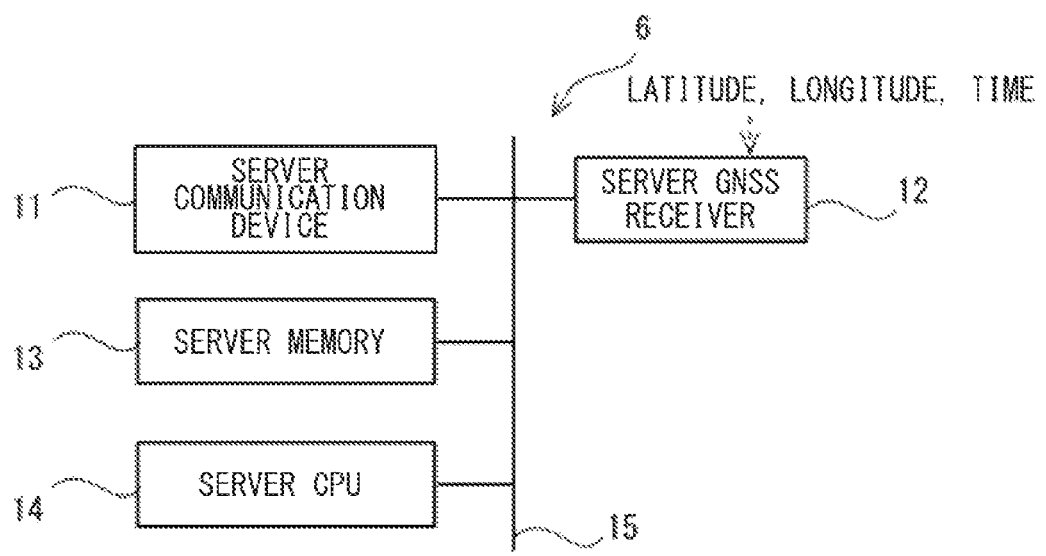
FIG. 2 is a hardware configuration diagram illustrating a server illustrated in FIG. 1.

FIG. 2 is a hardware configuration diagram illustrating the server 6 illustrated in FIG. 1.

The server 6 illustrated in FIG. 2 may include a server communication device 11, a server GNSS receiver 12, a server memory 13, a server central processing unit (CPU) 14, and a server bus 15. The server communication device 11, the server GNSS receiver 12, the server memory 13, and the server CPU 14 may be coupled to the server bus 15.

The server communication device 11 may be coupled to the communication network including the dedicated network 5. The server communication device 11 may transmit and receive data to and from another device coupled to the communication network, for example, the wireless base stations 4 or the terminal device 2 of the vehicle 100.

The server GNSS receiver 12 may receive the radio wave of the GNSS satellite 110 to obtain a current time. The server 6 may include an unillustrated server timer calibrated on the basis of the current time of the server GNSS receiver 12.

The server memory 13 may record a program to be executed by the server CPU 14, and data.

The server CPU 14 may read the program from the server memory 13 and execute the program. Thus, a server controller may be implemented in the server 6.

The server CPU 14 serving as the server controller may manage overall operation of the server 6. The server CPU 14 may acquire information to be collected in the mobility information provision system 1, generate information to be provided to the communication apparatuses, and transmit the information.

In one embodiment, the server CPU 14 may serve as a "collector", a "mapping unit", and a "generator".

It is to be noted that the communication apparatus may be the server 6 or the wireless base station 4. Since the wireless base station 4 is closer to the server CPU 14 on the network, responsiveness is improved when the server CPU 14 communicates with the wireless base station 4.

Figure 3:
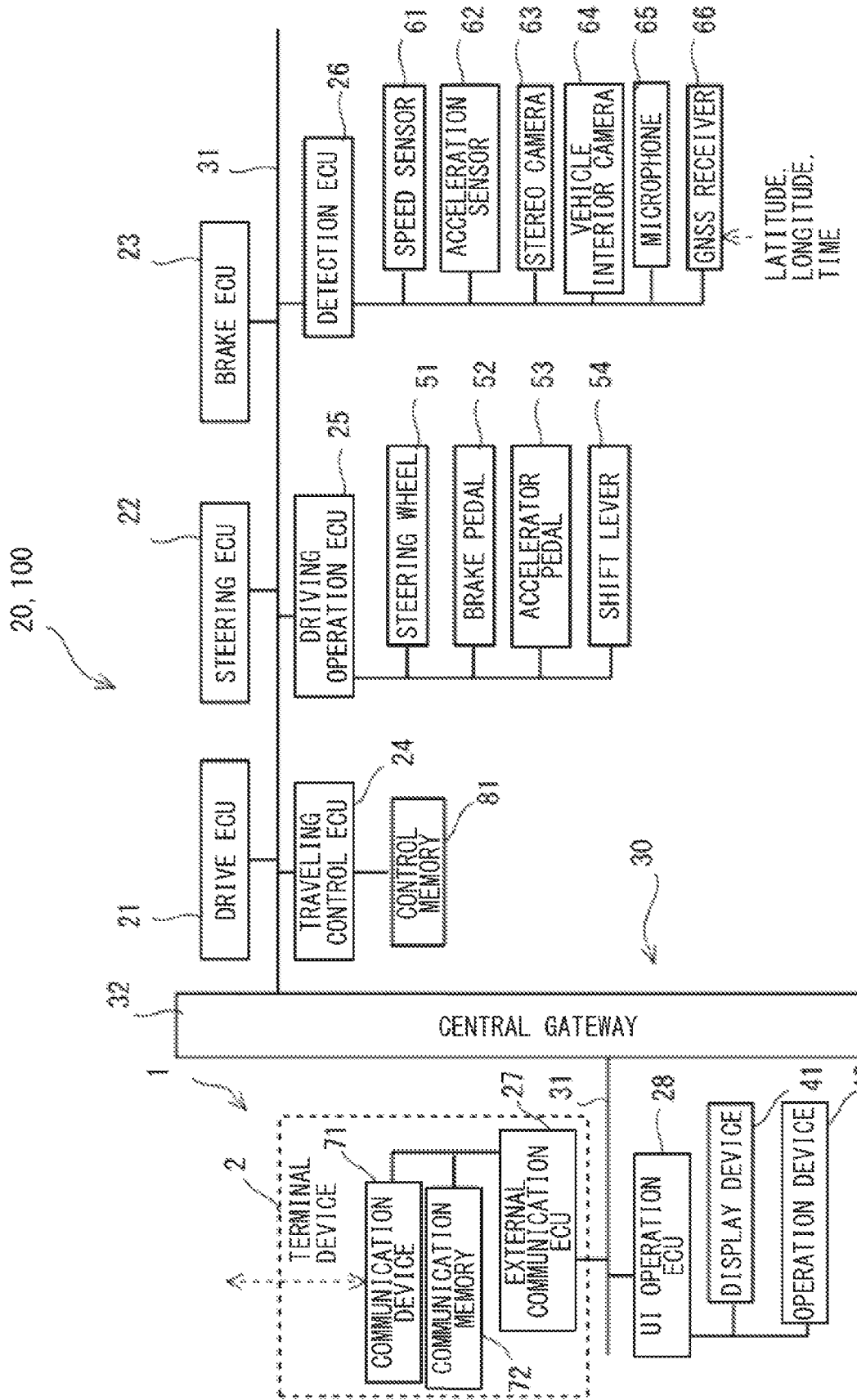
FIG. 3 is a configuration diagram illustrating a control system that controls automatic driving, for example, of a vehicle illustrated in FIG. 1.

FIG. 3 is a configuration diagram illustrating a control system 20 that controls the automatic driving, for example, of the vehicle 100 illustrated in FIG. 1.

FIG. 3 illustrates, as representatives, respective control electronic control units (ECUs) incorporated in a plurality of control devices included in the control system 20 in the vehicle 100. Like the server 6 illustrated in FIG. 2, each of the control devices may include, in addition to the control ECU, for example, a memory, an input and output port, a timer, and an internal bus. The memory may be configured to record a control program and data. The input and output port may be coupled to a target to be controlled or to a state detector for the target to be controlled. The timer may be configured to measure a time and a time period. The internal bus may be coupled to the above-described components.

In one example, the control ECUs illustrated in FIG. 3 may be a drive ECU 21, a steering ECU 22, a brake ECU 23, a traveling control ECU 24, a driving operation ECU 25, a detection ECU 26, an external communication ECU 27, and a user interface (UI) operation ECU 28. The control system 20 in the vehicle 100 may include another non-illustrated control ECU.

These control ECUs may configure a controller of the control system 20 of the vehicle 100.

In one embodiment, these control ECUs may serve as a "controller".

The plurality of control ECUs may be coupled to a vehicle network 30 such as a controller area network (CAN) or a local interconnect network (LIN) employed in the vehicle 100. The vehicle network 30 may include a plurality of bus cables 31 and a central gateway (CGW) 32. The plurality of bus cables 31 may allow the plurality of control ECUs to be coupled to each other. The central gateway (CGW) 32 may serve as a relay to which the plurality of bus cables 31 is coupled. Identifications (IDs) different from each other may be allocated to the plurality of control ECUs. The IDs may each serve as identification information. The control ECUs may each output data periodically to other control ECUs. The data may have an ID for one of the control ECUs and another ID for another one of the control ECUs. The one of the control ECUs may represent a source of output. The other one of the control ECUs may represent a destination of output. Each of the other control ECUs may monitor the bus cables 31. In a case where an ID that represents a destination of output corresponds to the ID of one of the control ECUs, for example, the one of the control ECUs may acquire data, and execute processing on the basis of the data. The central gateway 32 may monitor each of the plurality of bus cables 31 being coupled. In a case where one of the control ECUs representing a source of output is coupled to one of the bus cables 31, another one of the control ECUs is coupled to another one of the bus cables 31, and the central gateway 32 detects that an ID representing a destination of output corresponds to the other one of the control ECUs, the central gateway 32 may output data to the other one of the bus cables 31. Through the relay processing performed by the central gateway 32, while one of the plurality of control ECUs is coupled to one of the bus cables 31, and another one of the control ECUs is coupled to another one of the bus cables 31, exchanging of data to be inputted and outputted may be achieved between the one of the plurality of control ECUs and the other one of the plurality of control ECUs.

The UI operation ECU 28 may be coupled to a user interface device for the user riding the vehicle 100. For example, the UI operation ECU 28 may be coupled to a display device 41 and an operation device 42. The display device 41 may be, for example, a liquid crystal device or an image projection device. The operation device 42 may be, for example, a touch panel, a keyboard, or a noncontact operation detection device. The display device 41 and the operation device 42 may be installed, for example, on an inner surface of a vehicle compartment in which the user rides. The UI operation ECU 28 may acquire data from the vehicle network 30, and cause the display device 41 to perform display on the basis of the data. When the operation device 42 accepts an operation input, the UI operation ECU 28 may output the operation input to the vehicle network 30. The UI operation ECU 28 may execute processing on the basis of the operation input. The UI operation ECU 28 may include a result of the processing in the data. The UI operation ECU 28 may cause the display device 41 to display, for example, a navigation screen for setting of a destination, search for a route to the destination selected by an operation input, and include the route data in the data. The route data may include attribute information of a lane, for example, of a road to be used for the movement from the current location to the destination.

The driving operation ECU 25 may be coupled, for example, to operation members. The operation members may be used by the user to control the traveling of the vehicle 100. Examples of the operation members may include a steering wheel 51, a brake pedal 52, an accelerator pedal 53, and a shift lever 54. As one of the operation members is operated, the driving operation ECU 25 may output data to the vehicle network 30. The data may include whether there is an operation and an amount of the operation. The driving operation ECU 25 may execute processing regarding the operation that is made on the one of the operation members. The driving operation ECU 25 may include a result of the processing in the data. In a case where, for example, the accelerator pedal 53 is operated in a situation where another mobile body or a fixed object lies in front of the vehicle 100 in the traveling direction, the driving operation ECU 25 may determine that the operation is abnormal. The driving operation ECU 25 may include a result of the determination in the data.

The detection ECU 26 may be coupled, for example, to detection members. The detection members may each detect a traveling state of the vehicle 100. Examples of the detection members may include a speed sensor 61, an acceleration sensor 62, a camera such as a stereo camera 63, a vehicle interior camera 64, a microphone 65, and a GNSS receiver 66. The speed sensor 61 may be configured to detect a speed of the vehicle 100. The acceleration sensor 62 may be configured to detect a rate of acceleration of the vehicle 100. The stereo camera 63 may be configured to capture an image of an outside area of the vehicle 100. The vehicle interior camera 64 may be configured to capture an image of the user in the vehicle compartment. The microphone 65 may be configured to convert sound inside and outside the vehicle 100 into data. The GNSS receiver 66 may be configured to detect a position of the vehicle 100. The GNSS receiver 66 may receive the radio waves from the GNSS satellites 110, like the server GNSS receiver 12, to obtain a latitude and a longitude, indicating the current position of the own vehicle, and a current time. It is thus expected that the current time of the vehicle 100 match, with high precision, the current time based on the server GNSS receiver 12 of the server 6. The detection ECU 26 may acquire detection information from each of the detection members, and output data including the detection information to the vehicle network 30. The detection ECU 26 may execute processing on the basis of the detection information. The detection ECU 26 may include a result of the processing in the data. In a case where, for example, the acceleration sensor 62 detects acceleration, and a rate of the acceleration exceeds a threshold for collision detection, the detection ECU 26 may determine that a collision is detected. The detection ECU 26 may include a result of the collision detection in the data. The detection ECU 26 may extract a mobile body on the basis of a captured image obtained by the stereo camera 63. The mobile body may be a pedestrian or the other vehicle 100, for example, present around the own vehicle. The detection ECU 26 may determine a type and an attribute of the mobile body. The detection ECU 26 may estimate a relative direction, a relative distance, and a moving direction of the mobile body in accordance with a position, a size, and a change of the mobile body in the image. The detection ECU 26 may include information on the mobile body, including a result of the estimation, in the data, and output the data to the vehicle network 30.

The external communication ECU 27 may be coupled to a communication device 71 and a communication memory 72. The terminal device 2 may include the external communication ECU 27, the communication device 71, and the communication memory 72. The communication device 71 may transmit and receive, to and from a device outside the vehicle, data to be transmitted and received by the external communication ECU 27. The device outside the vehicle may be, for example, the wireless base station 4 or the communication device 71 of the other vehicle 100. The communication device 71 may communicate with the communication apparatuses provided for respective areas or sections. The communication memory 72 may be a computer-readable recording medium. The communication memory 72 may record a program to be executed by the external communication ECU 27, set values, and data to be transmitted and received by the external communication ECU 27. The external communication ECU 27 may, via the communication device 71, transmit and receive data to and from the server 6, for example. The external communication ECU 27 may, for example, collect own vehicle information via the vehicle network 30, and transmit the own vehicle information to the server 6. The external communication ECU 27 may acquire, from the communication device 71, the primary processed information transmitted by the server 6 to the own vehicle, for example, and record the primary processed information in the communication memory 72.

Examples of the own vehicle information to be collected by the external communication ECU 27 may include vehicle interior information such as a state of the user riding the own vehicle, information on the traveling state of the own vehicle, peripheral information such as a traveling environment of the own vehicle, and information on a region where the own vehicle is traveling. The peripheral information may include information about another mobile body present around the own vehicle. Examples of the information on the traveling state of the own vehicle include information detected by an autonomous sensor, like the above-described sensors, provided in the own vehicle. The autonomous sensor may be a vehicle-mounted sensor, examples of which may include an acceleration sensor, a global positioning system (GPS) sensor, a gyro sensor, an electromagnetic compass, an air pressure sensor, a camera, a radar sensor, an ultrasonic sensor, and an infrared sensor. The autonomous sensor may detect information related to the movement of the own vehicle, information on the user of the own vehicle, vehicle information such as a vehicle number, or the peripheral information or the region information of the own vehicle. The information on the traveling state of the own vehicle may include information on the traveling state calculatable on the basis of the detection by such sensors, for example, information on the yaw rate. The own vehicle information to be transmitted by the external communication ECU 27 may be the own vehicle information collected by the external communication ECU 27 and unprocessed. Alternatively, the own vehicle information may be the collected information subjected to processing, filtering, coding, or quantization. The external communication ECU 27 may, as the terminal device 2, repeatedly transmit the own vehicle information to the communication apparatuses.

Information to be acquired by the external communication ECU 27 from the server 6 may include, in addition to the primary processed information addressed to the own vehicle, primary processed information addressed to another surrounding mobile body. The information to be acquired may also include interpolation information not acquirable by the autonomous sensor. The external communication ECU 27 may, as the terminal device 2, repeatedly receive at least information usable for determination or control of the movement of the own vehicle, from the communication apparatuses.

The traveling control ECU 24 may be coupled to a control memory 81. The control memory 81 may be a computer-readable recording medium. The control memory 81 may record a program to be executed by the traveling control ECU 24, set values, and other information. The control memory 81 may record information on details of the control performed by the traveling control ECU 24. The traveling control ECU 24 may read the program from the control memory 81, and execute the program. This enables the traveling control ECU 24 to serve as a controller configured to control the traveling of the vehicle 100.

The traveling control ECU 24 may acquire data from, for example, the external communication ECU 27, the detection ECU 26, and the driving operation ECU 25 via the vehicle network 30, and control the traveling, e.g., automatic driving or manual driving assist, of the vehicle 100. The traveling control ECU 24 may generate, on the basis of the acquired data, traveling control data to be used to control the traveling of the vehicle 100. The traveling control ECU 24 may output the traveling control data to the drive ECU 21, the steering ECU 22, and the brake ECU 23. The drive ECU 21, the steering ECU 22, and the brake ECU 23 may control the traveling of the vehicle 100 on the basis of the inputted travel control data. The traveling control ECU 24 may, as movement control device, control the movement of the vehicle 100 by using the information received by the terminal device 2.

Next, description will be given on control of courses of the vehicles 100 by the mobility information provision system 1 having the above-described configuration.

Figure 4:
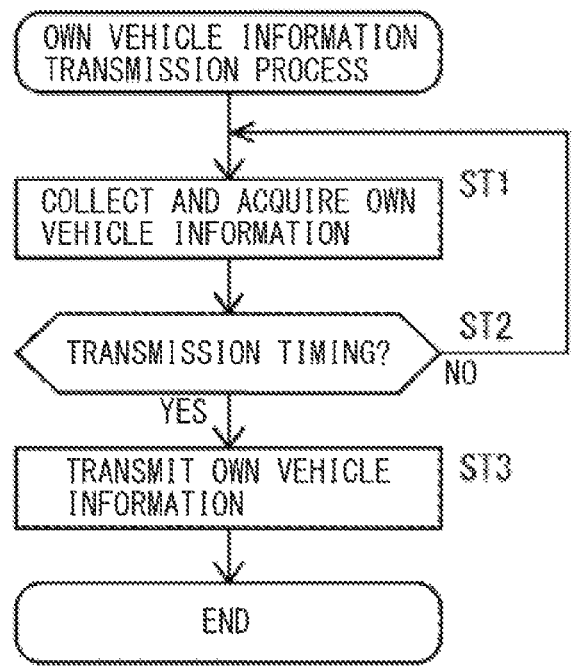
FIG. 4 is a flowchart illustrating a process of transmitting own vehicle information by an external communication ECU illustrated in FIG. 3.

FIG. 4 is a flowchart illustrating a process of transmitting the own vehicle information by the external communication ECU 27 illustrated in FIG. 3.

The external communication ECU 27 may serve as a communication apparatus provided in each of the vehicles 100. In a case of being able to communicate with the wireless base station 4, for example, the external communication ECU 27 may repeatedly execute the own vehicle information transmission process illustrated in FIG. 4. A cycle by which the external communication ECU 27 transmits the own vehicle information may be within a range of, for example, about several ten milliseconds to about several seconds.

In Step ST1, the external communication ECU 27 may collect and acquire the own vehicle information from the vehicle interior. For example, the external communication ECU 27 may acquire data, via the vehicle network 30, from the traveling control ECU 24, the detection ECU 26, and the driving operation ECU 25. The external communication ECU 27 may thus collect, for example, the traveling state of the own vehicle, the state of the riding user, the peripheral information of the own vehicle, and the information on the region where the own vehicle is traveling. The traveling state of the own vehicle may be information such as the current position, the traveling direction, or the traveling speed of the own vehicle. The external communication ECU 27 may also calculate, on the basis of the acquired information, information not obtainable as a detection value of the autonomous sensor, for example, information on the yaw rate. The external communication ECU 27 may record these pieces of collected data in the communication memory 72. The data collected by the external communication ECU 27 may include a detection time of each piece of the data.

In Step ST2, the external communication ECU 27 may determine whether a transmission timing of the own vehicle information has arrived. For example, the external communication ECU 27 may determine, on the basis of the current time of the GNSS receiver 66, whether time elapsed from the previous transmission timing has reached a predetermined transmission cycle. The control system 20 of the vehicle 100 may include, for example, a vehicle timer coupled to the vehicle network 30, the central gateway 32, the external communication ECU 27, or the traveling control ECU 24 and calibrated on the basis of the current time of the GNSS receiver 66. In that case, a time of the vehicle timer may be used. In a case where the transmission cycle has not been reached (Step ST2: NO), the external communication ECU 27 may cause the process to return to Step ST1. Upon determining that the transmission cycle has been reached and the transmission timing has arrived (Step ST2: YES), the external communication ECU 27 may cause the process to proceed to Step ST3.

In Step ST3, the external communication ECU 27 may transmit the information collected in Step ST1 to the server 6 via the communication device 71. The communication device 71 may transmit the information collected in Step ST1 to the wireless base station 4 with which the communication device 71 is able to communicate in a communication environment at the time of the transmission. The wireless base station 4 may transmit the information received from the communication device 71 of the vehicle 100 to the server 6 via the dedicated network 5. The information transmitted from the communication device 71 of the vehicle 100 to the wireless base station 4 may include, for example, the own vehicle information, the latest current location of the vehicle 100, and the latest time of the vehicle 100. The own vehicle information may be, for example, a value detected by the vehicle 100 and its detection time.

As described above, the terminal device 2 of each the vehicles 100 may repeatedly transmit the current or past detection information, obtained by the autonomous sensor of each of the vehicles, to the communication apparatus in charge of an area or a section accommodating the vehicle. Each of the communication apparatuses may repeatedly receive, from the terminal device 2 of the vehicle 100 moving in the area or the section of which the communication apparatus is in charge, the current or past information of the corresponding vehicle 100. Each of the communication apparatuses may transmit, to the server 6, the information received from the terminal device 2 of the vehicle 100.

Figure 5:
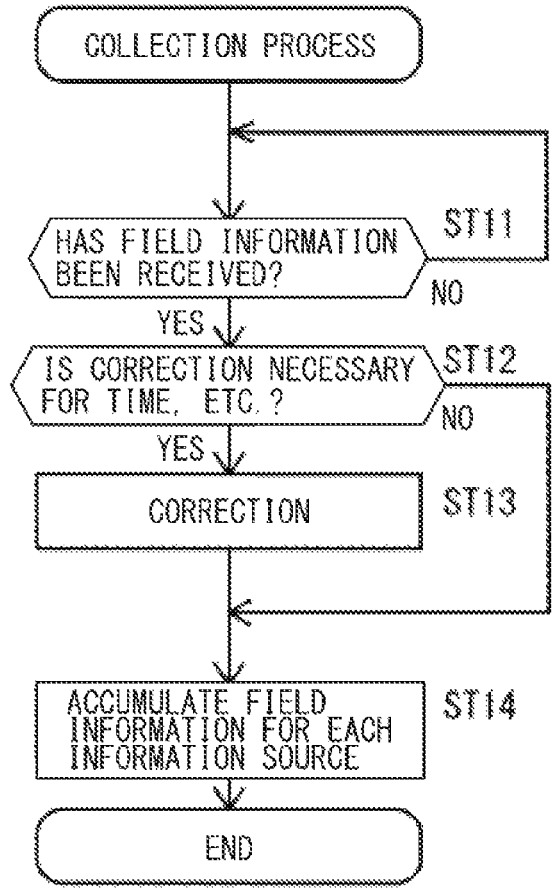
FIG. 5 is a flowchart illustrating a process of collecting field information related to movement of a plurality of vehicles by a server CPU illustrated in FIG. 2.

FIG. 5 is a flowchart illustrating a process of collecting the field information related to the movement of the vehicles 100 by the server CPU 14 illustrated in FIG. 2.

The server CPU 14 of the server 6 may repeatedly execute the collection process illustrated in FIG. 5, each time the server communication device 11 of the server 6 receives new field information.

In Step ST11, the server CPU 14 may determine whether the field information has been received. Examples of the field information may include the own vehicle information transmitted by the terminal device 2 of each of the vehicles 100, and detection information of a detection device, such as a camera, installed on a road. An unillustrated server of the advanced traffic system may transmit, to the server 6, traffic information of a region managed by the advanced traffic system, for example. The server communication device 11 may receive these pieces of information. In a case where the server communication device 11 has not received the field information (Step ST11: NO), the server CPU 14 may repeat the process in Step ST11. When the server communication device 11 receives the field information (Step ST11: YES), the server CPU 14 may cause the process to proceed to Step ST12.

It is to be noted that the server of the advanced traffic system may server as the server 6. In this case, the process of generating information on a course or a movable range within which each of the vehicles 100 is able to travel in a short section is performed after the traffic information of the advanced traffic system is collected, and thus communications between the serves can be reduced.

In Step ST12, the server CPU 14 may determine whether correction is necessary for a time, for example, included in the received field information. The time of the vehicle 100 and the time of the server 6, for example, may be based on the radio wave of the GNSS satellite 110 of a common group, and may therefore be assumed to match originally. However, the vehicle 100 can be traveling in a situation in which the radio wave of the GNSS satellite 110 is not receivable, for example, in a tunnel. In this case, the time of the vehicle 100 will be updated on the basis of a timer of the vehicle 100, and can include an error with respect to the common time. Thus, the time, for example, of the field information transmitted by the vehicle 100 can be different from the time of the server 6.

The server CPU 14 may determine presence or absence of such an error on the basis of, for example, comparison between the received field information and information of the server 6, or comparison between a position included in the received field information and map data. In a case where an error equal to or greater than a set threshold is determined to be present (Step ST12: YES), the server CPU 14 may determine that correction is necessary, and cause the process to proceed to Step ST13. In a case where the error is less than the threshold (Step ST12: NO), the server CPU 14 may determine that correction is unnecessary, and cause the process to proceed to Step ST14.

In Step ST13, the server CPU 14 may correct the received field information. The field information may be corrected by any of various methods. For example, a value such as the time included in the field information itself may be corrected, or information on an error range may be added to the value such as the time. For example, for the time of the vehicle 100 traveling through a tunnel, the server CPU 14 may add information on a time error range corresponding to time elapsed from entry to the tunnel.

The server CPU 14 may also correct other information to be corrected accordingly with the correction of the time, for example, the position and the speed of the vehicle 100.

It is to be noted that such information to be used to correct the field information may be included when the vehicle 100 transmits the field information, or may be added by the wireless base station 4 that relays the field information. The field information correction process may be performed for the information collected by the vehicle 100, or for the field information relayed by the wireless base station 4.

In Step ST14, the server CPU 14 may classify the received or corrected field information, according to information sources thereof, and accumulate the classified field information in the server memory 13. The server memory 13 of the server 6 may thus accumulate and record, as the field information related to the movement of the vehicles 100, the information about the vehicle 100 and the user or the peripheral information received from each of the vehicles 100, or the traffic information of the region in which each of the vehicles 100 is moving. The server CPU 14 may record, in association with the received field information, a time at which each piece of the field information has been received.

In FIG. 5, the server CPU 14 may, in a case where correction is necessary for the time, for example, of the received field information, directly correct the time of the received field information.

In another example, the server CPU 14 may execute the process illustrated in FIG. 5, without correcting the time, for example, of the received field information.

In this case, the server CPU 14 may further generate additional field information to be used to enlarge the error range for the time, for example, of the received field information. On the basis of such additional information about the error range, it is possible for the server CPU 14 to obtain, in a subsequent process, information about a range of possible errors in the position and the speed, for example, of the vehicle 100. This makes it possible to, for example, increase the possibility of the vehicle 100 being actually present within a position range of the vehicle 100 to be subjected to processing by the server CPU 14.

Figure 6:
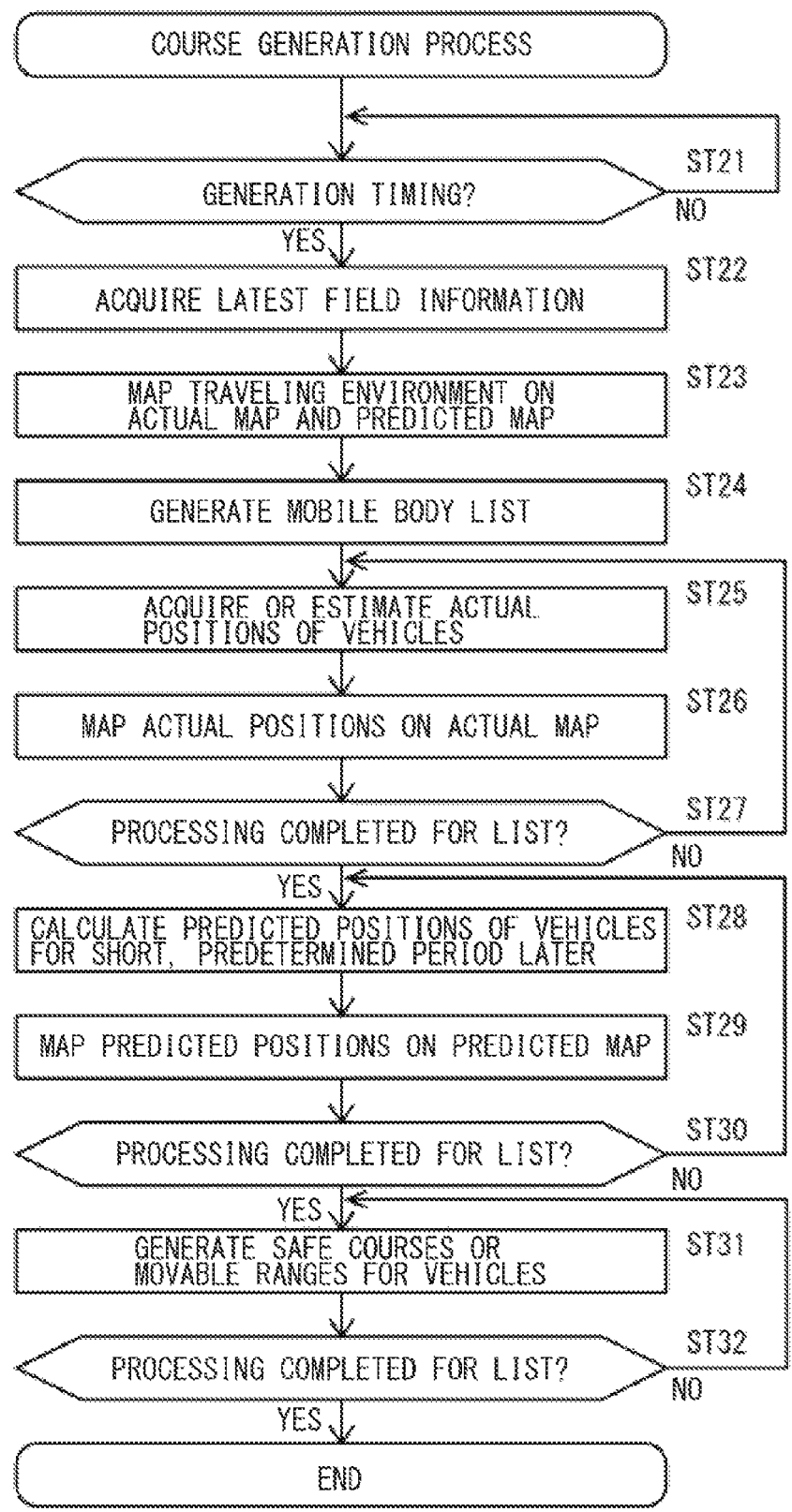
FIG. 6 is a flowchart illustrating a process of generating, by the server CPU illustrated in FIG. 2, as primary processed information, information on a course or a movable range within which each of the vehicles is able to travel in a short section.

FIG. 6 is a flowchart illustrating a process of generating, by the server CPU 14 illustrated in FIG. 2, as the primary processed information, information on a course or a movable range within which each of the vehicles 100 is able to travel in a short section.

The server CPU 14 of the server 6 may repeatedly execute the course generation process illustrated in FIG. 6. A cycle by which the server CPU 14 executes the course generation process may be, for example, shorter than time taken for the vehicle 100 to travel through a course based on the primary processed information. For example, the cycle may be about several ten milliseconds to about several hundred milliseconds.

In Step ST21, the server CPU 14 may determine whether a timing of generating new courses for the vehicles 100 has arrived. The server CPU 14 may determine, on the basis of the current time of the server GNSS receiver 12, whether time elapsed from the previous generation timing has reached a predetermined generation cycle. In a case where the generation cycle has not been reached (Step ST21: NO), the server CPU 14 may repeat the determination process in Step ST21. Upon determining that the generation cycle has been reached and the generation timing has arrived (Step ST21: YES), the server CPU 14 may cause the process to proceed to Step ST22.

In Step ST22, the server CPU 14 may acquire, from the server memory 13, the latest field information that has been received by the server communication device 11. For example, the server CPU 14 may acquire the field information related to the movement of the vehicles 100 collected from the vehicles 100. The server CPU 14 may acquire preliminary processed information processed by the wireless base station 4 on the basis of the field information, for example. The server CPU 14 may acquire, as the field information related to the movement of the vehicles 100, information related to the movement of the vehicles 100, information on the users of the vehicles 100, and the peripheral information or the region information of the vehicles 100, from the respective vehicles 100.

In Step ST23, the server CPU 14 may map the traveling environment on an actual map and a predicted map. The traveling environment may be, for example, information about a traffic congestion situation or a road closure situation indicating a state of each road. By the mapping of the traveling environment, information indicating the traveling environment may be allocated, on the actual map and the predicted map, for each position or range corresponding to the traveling environment.

The actual map and the predicted map may each be a road map of a region about which the mobility information provision system 1 provides information. The actual map and the predicted map may each be a world map. The actual map and the predicted map may be recorded in the server memory 13.

The actual map may be a road map on which actual positions of the vehicles 100 at the current time of the server GNSS receiver 12 are to be mapped in real time. It is to be noted that the actual map may be a road map on which the actual positions at a time later than the current time of the server GNSS receiver 12 by a short, predetermined period of time are to be mapped substantially in real time.

The predicted map may be a road map on which predicted positions of the vehicles 100 estimated for a time later than the time of the actual map by a predetermined period are to be mapped. For example, the predicted map may be a road map at a point in time later than the time of the actual map by about several seconds.

In Step ST24, the server CPU 14 may generate, from the latest field information, a mobile body list about the vehicles 100 to which it is necessary for the server 6 to issue notification at this point in time. The mobile body list may include another mobile body, such as the other vehicle 100, to which it is not necessary for the server 6 to issue notification.

From Step ST25, the server CPU 14 may start a process for mapping of the actual positions of the target vehicles 100 on the actual map. By the mapping of each of the vehicles 100, information on the vehicle 100 may be allocated, on the actual map, for each of the actual positions of the vehicles 100.

The server CPU 14 may acquire or estimate, from the latest field information, the actual position of the vehicle 100 included in the mobile body list and not subjected to processing yet. The term "actual" or "this point in time" does not necessarily refer to the time itself of the server GNSS receiver 12, and may be a point in time later than the time of the server GNSS receiver 12 by several hundred milliseconds. In a case where a time lag between a time corresponding to the latest current location of the vehicle 100 and this point in time is equal to or less than a threshold of about several hundred milliseconds, the server CPU 14 may regard the acquired current location as the actual position of the vehicle 100. In a case where the time lag is greater than the threshold, the server CPU 14 may use the own vehicle information, such as the moving direction, the movement speed, or the attitude of the vehicle 100, to calculate a direction and an amount of movement that has occurred from the acquired latest current location. The server CPU 14 may regard a position based on a result of the calculation as the actual position of the vehicle 100.

In Step ST26, the server CPU 14 may map, on the actual map, the actual positions of the mobile bodies estimated on the basis of the latest field information. Thus, the actual positions based on the latest information about the vehicles 100 may be mapped on the actual map with high accuracy.

In Step ST27, the server CPU 14 may determine whether processing has been completed for the vehicles 100 of the mobile body list. In a case where processing for all the vehicles 100 of the mobile body list has not been completed (Step ST27: NO), the server CPU 14 may cause the process to return to Step ST25. The server CPU 14 may select the next vehicle 100 not subjected to processing yet, and repeat the processes from Step ST25 to Step ST27. Upon completion of the processing for all the vehicles 100 of the mobile body list (Step ST27: YES), the server CPU 14 may terminate the process of mapping on the actual map, and cause the process to proceed to Step ST28. Thus, the actual positions of the target vehicles 100 may be mapped, on the actual map, to represent a relative positional relationship between the target vehicles 100.

From Step ST28, the server CPU 14 may start a process for mapping, on the predicted map, of future predicted positions of the target vehicles 100 for a predetermined period later. Here, the predicted positions may be predicted positions at a time several seconds after the time of the actual map.

The server CPU 14 may estimate, by calculation from the latest field information, the predicted position of the vehicle 100 included in the mobile body list and not subjected to processing yet. The server CPU 14 may use the information on the vehicle 100 to be subjected to the calculation, to calculate the predicted position at a prediction time later than the actual time by a short period. The prediction time may be a time later than the actual time by several hundred milliseconds to several seconds. The server CPU 14 may use the own vehicle information, such as the moving direction, the movement speed, or the attitude of the vehicle 100, to calculate a moving direction and an amount of movement from the actual position, in consideration of a behavior of the vehicle 100. The server CPU 14 may regard a position based on a result of the calculation as the predicted position of the vehicle 100.

In Step ST29, the server CPU 14 may map, on the predicted map, the predicted positions of the mobile bodies estimated on the basis of the latest field information. Thus, the predicted positions based on the latest information about the vehicles 100 may be mapped on the predicted map.

In Step ST30, the server CPU 14 may determine whether processing has been completed for the vehicles 100 of the mobile body list. In a case where processing for all the vehicles 100 of the mobile body list has not been completed (Step ST30: NO), the server CPU 14 may cause the process to return to Step ST28. The server CPU 14 may select the next vehicle 100 not subjected to processing yet, and repeat the processes from Step ST28 to Step ST30. Upon completion of the processing for all the vehicles 100 of the mobile body list (Step ST30: YES), the server CPU 14 may terminate the process of mapping on the predicted map, and cause the process to proceed to Step ST31. Thus, the predicted positions of the target vehicles 100 may be mapped, on the predicted map, to represent a relative positional relationship between the target vehicles 100.

In Step ST31, the server CPU 14 may generate courses or ranges that allow the target vehicles 100 to travel safely. For example, the server CPU 14 may generate, for each of the target vehicles 100, a safe course not interfering with or approaching another mobile body, from the actual position of the vehicle 100 on the actual map toward the predicted position of the vehicle 100 on the predicted map. If the vehicle 100 is assumed to move from the actual position to the predicted position, and a course of the vehicle 100 does not intersect with a course of the other vehicle 100, or intersects with the course of the other vehicle 100 with a time lag, the server CPU 14 may, for example, generate a traveling course from the actual position to the predicted position. In contrast, if the vehicle 100 is assumed to move from the actual position to the predicted position, and a course of the vehicle 100 intersects with a course of the other vehicle 100 at substantially the same time, the server CPU 14 may generate a course from the actual position to a position immediately before the intersection, as a traveling course. In this case, the server CPU 14 may generate a course of decelerating to stop at the position immediately before the intersection. These processes enable the server CPU 14 to generate, on the basis of virtual courses of the vehicles 100 from the positions on the actual map to the positions on the predicted map, a course within which each of the vehicles 100 is able to travel safely in a short section, to prevent the courses of the vehicles 100 from intersecting with each other. The server CPU 14 may generate, instead of such a specific course, a safely movable range that allows each of the vehicles 100 to travel safely. The safely movable range may be generated, for example, not to overlap the safely movable range of the other vehicle 100. The server CPU 14 may record the course or the range generated for each of the vehicles 100, as the primary processed information obtained from the field information, in the server memory 13. The server CPU 14 may generate, on the basis of the acquired information, the primary processed information usable for determination or control of the movement of the vehicle 100 in each of the vehicles 100 or the terminal devices 2.

In Step ST32, the server CPU 14 may determine whether processing has been completed for the vehicles 100 of the mobile body list. In a case where processing for all the vehicles 100 of the mobile body list has not been completed (Step ST32: NO), the server CPU 14 may cause the process to return to Step ST31. The server CPU 14 may select the next vehicle 100 not subjected to processing yet, and repeat the processes from Step ST31 to Step ST32. Upon completion of the processing for all the vehicles 100 of the mobile body list (Step ST32: YES), the server CPU 14 may terminate the course generation process illustrated in FIG. 6.

As described above, the server CPU 14 may map, on the actual map, the actual positions of the plurality of mobile bodies estimated on the basis of the collected field information. The server CPU 14 may also estimate the future predicted positions of the plurality of mobile bodies, on the basis of the actual map, and the traveling direction, the traveling speed, or the traveling state of each of the plurality of mobile bodies estimated on the basis of the collected field information. The server CPU 14 may map the predicted positions on the predicted map. The server CPU 14 may generate, assuming the movement of the plurality of mobile bodies from the positions on the actual map to the positions on the predicted map, a course or a movable range within which each of the plurality of mobile bodies is able to travel in a short section, as the primary processed information obtained on the basis of the field information.

Figure 7:
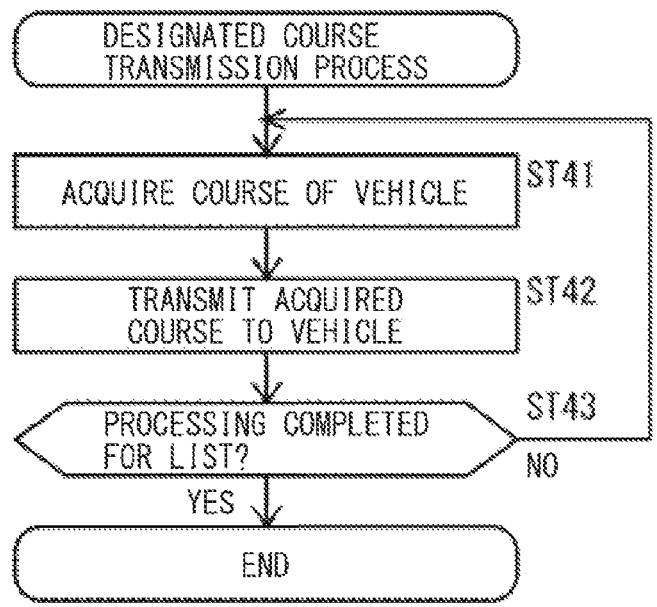
FIG. 7 is a flowchart illustrating a process of transmitting, by the server CPU illustrated in FIG. 2, information usable for determination or control of the movement of the vehicle and generated in the generation process illustrated in FIG. 6.

FIG. 7 is a flowchart illustrating a process of transmitting, by the server CPU 14 illustrated in FIG. 2, the information usable for determination or control of the movement of the vehicle 100 and generated in the generation process illustrated in FIG. 6.

The server CPU 14 of the server 6 may repeatedly execute the information transmission process illustrated in FIG. 7. A cycle by which the server 6 transmits the information may be within a range of, for example, about several ten milliseconds to about several seconds to be the same as the transmission cycle of the vehicle 100 illustrated in FIG. 4.

For example, the server CPU 14 of the server 6 may generate the primary processed information, upon collecting the field information from the vehicles 100 by the process illustrated in FIG. 5. The primary processed information may be the course or the movable range within which each of the plurality of mobile bodies is able to travel in the short section, as illustrated in FIG. 6. In another example, the server CPU 14 may repeatedly execute the transmission process illustrated in FIG. 7, each time the server CPU 14 executes the course generation process illustrated in FIG. 6.

In Step ST41, the server CPU 14 may acquire, as the primary processed information, the latest information related to the course or the movable range of the vehicle 100 and recorded in the server memory 13.

In Step ST42, the server CPU 14 may transmit the acquired primary processed information, via the server communication device 11, to the communication device 71 of the vehicle 100 corresponding to the primary processed information. The primary processed information may be transmitted from the server 6 to the wireless base station 4 via the dedicated network 5, and may thereafter be transmitted from the wireless base station 4 to the terminal device 2 of the vehicle 100. The communication apparatuses may transmit the generated primary processed information to the terminal devices 2 provided in the vehicles 100.

In Step ST43, the server CPU 14 may determine whether processing has been completed for the vehicles 100 of the mobile body list. In a case where processing for all the vehicles 100 of the mobile body list has not been completed (Step ST43: NO), the server CPU 14 may cause the process to return to Step ST41. The server CPU 14 may select the next vehicle 100 not subjected to processing yet, and repeat the processes from Step ST41 to Step ST43. Upon completion of the processing for all the vehicles 100 of the mobile body list (Step ST43: YES), the server CPU 14 may terminate the transmission process illustrated in FIG. 7.

The server 6 may thus transmit, to the vehicles 100, the primary processed information to be used for the control or determination of each of the vehicles 100. For example, the server 6 may transmit, to each of the vehicles 100, the primary processed information indicating the traveling direction and the traveling speed of the vehicle 100. The primary processed information may further include, as information for verification, the actual position, the actual time, and the prediction time, for example. By repeating the process illustrated in FIG. 7, the server 6 may keep transmitting, repeatedly, the primary processed information related to the course in the short section to each of the vehicles 100.

It is to be noted that the server 6 may transmit, to the vehicles 100, the field information to be collected from the vehicles 100, together with or in place of the primary processed information.

Figure 8:
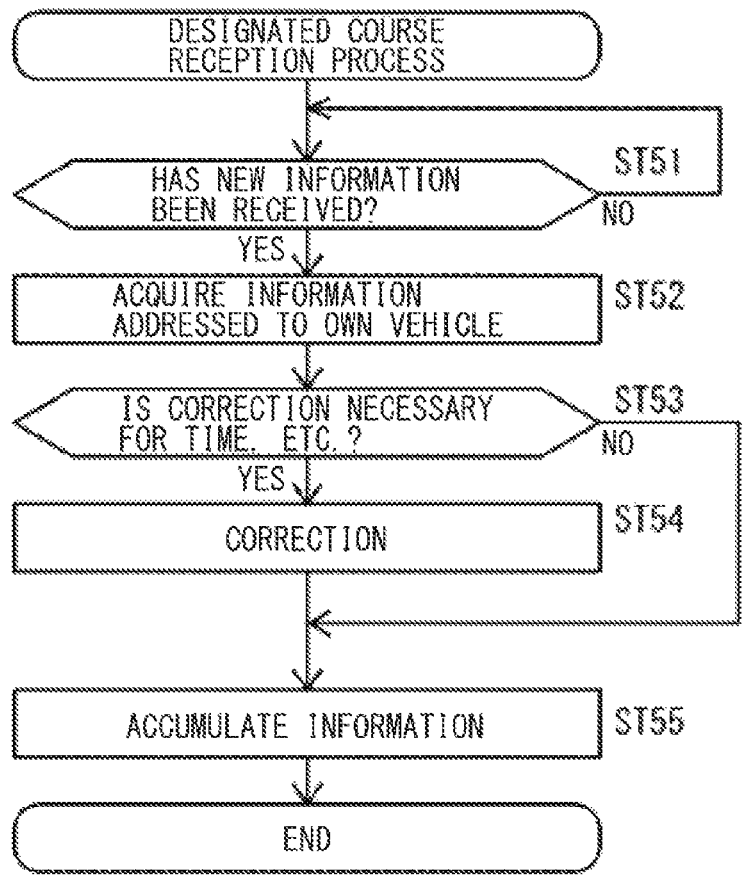
FIG. 8 is a flowchart illustrating a process of receiving information usable for determination or control of the movement of the vehicle by a terminal device of the control system for the vehicle illustrated in FIG. 3.

FIG. 8 is a flowchart illustrating a process of receiving the information usable for determination or control of the movement of the vehicle 100 by the terminal device 2 of the control system 20 of the vehicle 100 illustrated in FIG. 3.

The terminal device 2 of the vehicle 100 may receive the primary processed information from the wireless base station 4. The terminal device 2 may receive the field information from the wireless base station 4.

The external communication ECU 27 of the terminal device 2 may repeatedly execute the primary processed information reception process illustrated in FIG. 8. The external communication ECU 27 may repeatedly execute the reception process illustrated in FIG. 8, each time the primary processed information is received.

In Step ST51, the external communication ECU 27 may determine whether new information addressed to the own vehicle has been received. The communication device 71 may receive, from the server 6, the primary processed information addressed to the own vehicle or the field information addressed to the own vehicle. In this case, the external communication ECU 27 may determine that the new information addressed to the own vehicle has been received (Step ST51: YES), and cause the process to proceed to Step ST52. In a case where the communication device 71 has not received the new information addressed to the own vehicle from the server 6 (Step ST51: NO), the external communication ECU 27 may repeat the process in Step ST51.

In Step ST52, the external communication ECU 27 may acquire the information addressed to the own vehicle from the communication device 71. The information addressed to the own vehicle may refer to information usable for the control of the own vehicle. The information addressed to the own vehicle may include, for example, as well as information related to control of a device of the own vehicle, information related to surroundings of the own vehicle and processable into the information related to the control.

In Step ST53, the external communication ECU 27 may determine whether correction is necessary for a time, for example, included in the acquired information addressed to the own vehicle. The time of the vehicle 100 and the time of the server 6, for example, may be based on the radio wave of the GNSS satellite 110 of a common group, and may therefore be assumed to match originally. However, a situation can occur in which, at least temporarily, the server 6 is not able to receive the radio wave of the GNSS satellite 110. In this case, the time of the server 6 will be updated on the basis of a timer of the server 6, and can include an error with respect to the common time. Thus, the time, for example, of the field information transmitted by the server 6 can be different from the time of the vehicle 100.

The external communication ECU 27 may determine presence or absence of such an error on the basis of, for example, comparison between the received information and the information of the own vehicle. In a case where an error equal to or greater than a set threshold is determined to be present (Step ST53: YES), the external communication ECU 27 may determine that correction is necessary, and cause the process to proceed to Step ST54. In a case where the error is less than the threshold (Step ST53: NO), the external communication ECU 27 may determine that correction is unnecessary, and cause the process to proceed to Step ST55.

In Step ST54, the external communication ECU 27 may correct the acquired information. The information may be corrected by any of various methods. For example, a value such as the time included in the information itself may be corrected, or information on an error range may be added to the value such as the time.

The external communication ECU 27 may also correct other information to be corrected accordingly with the correction of the time, for example, the position and the speed of the vehicle 100.

It is to be noted that such information to be used to correct the information may be included when the server 6 transmits the information, or may be added by the wireless base station 4 that relays the information. The information correction process may be performed by the server 6 or by the wireless base station 4.

In Step ST55, the external communication ECU 27 may accumulate the acquired information addressed to the own vehicle in the communication memory 72. Thus, the information addressed to the own vehicle may be accumulated and recorded in the communication memory 72 of the vehicle 100.

As described above, the terminal device 2 of the vehicle 100 may receive and accumulate the primary processed information obtained on the basis of the field information related to the movement of the plurality of mobile bodies.

It is to be noted that the terminal device 2 may receive and accumulate the collected field information itself related to the movement of the plurality of mobile bodies.

Figure 9:
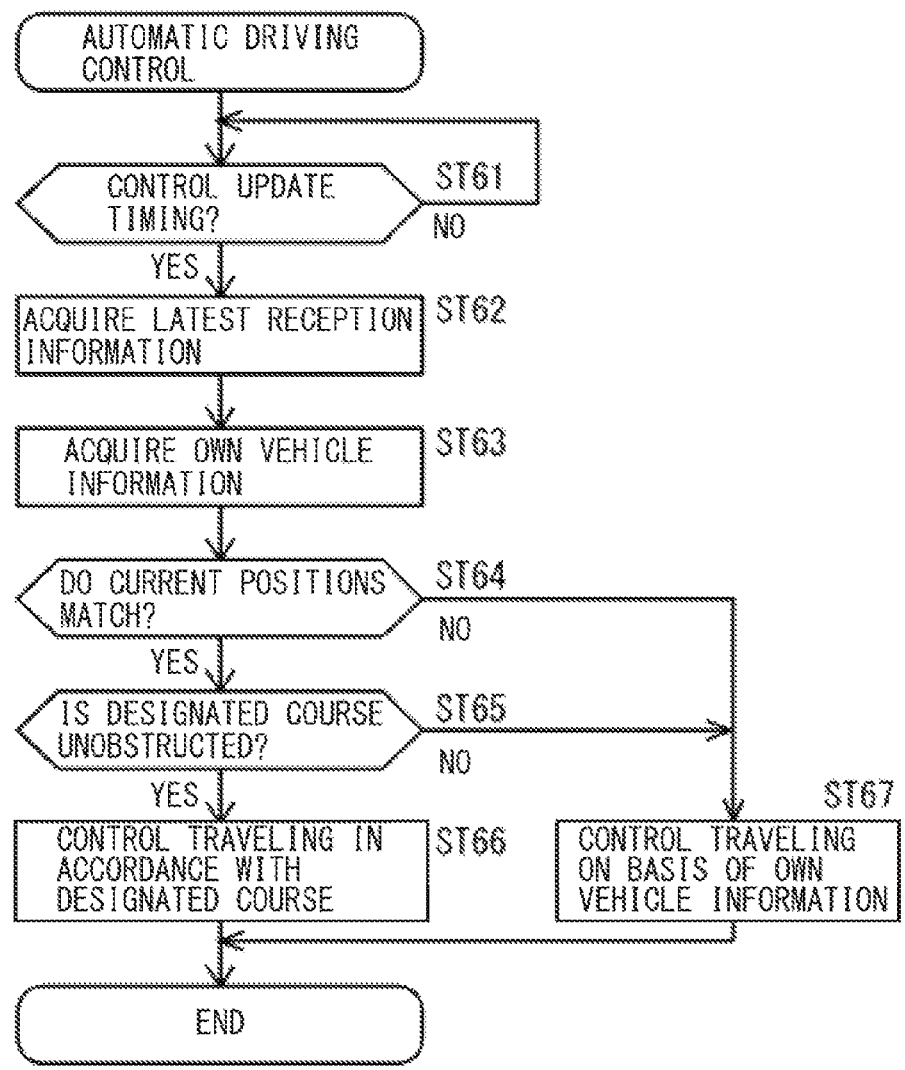
FIG. 9 is a flowchart illustrating a process of controlling automatic driving or driving assist of the vehicle by a traveling control ECU of the control system for the vehicle illustrated in FIG. 3.

FIG. 9 is a flowchart illustrating a process of controlling the automatic driving or the driving assist of the vehicle 100 by the traveling control ECU 24 of the control system 20 of the vehicle 100 illustrated in FIG. 3.

The traveling control ECU 24 that controls the traveling of the vehicle 100 may repeatedly execute the traveling control based on the primary processed information illustrated in FIG. 9. The traveling control ECU 24 may repeat the traveling control illustrated in FIG. 9 by, for example, a cycle shorter than time taken for the vehicle 100 to travel through the course based on the primary processed information. For example, the repetition cycle in this case may be about several ten milliseconds to about several hundred milliseconds.

In Step ST61, the traveling control ECU 24 may determine whether a timing of updating the control has arrived. The traveling control ECU 24 may determine, on the basis of the current time of the GNSS receiver 66, whether time elapsed from the previous control update timing has reached a predetermined update cycle. In another example, the traveling control ECU 24 may estimate a termination time of the currently executed control based on the course, and determine whether time left before the estimated termination time is less than a threshold. In a case where the update cycle has not been reached (Step ST61: NO), the traveling control ECU 24 may repeat the determination process in Step ST61. Upon determining that the update cycle has been reached and the control update timing has arrived (Step ST61: YES), the traveling control ECU 24 may cause the process to proceed to Step ST62.

In Step ST62, the traveling control ECU 24 may acquire the latest primary processed information. The traveling control ECU 24 may acquire, from the communication memory 72 via the external communication ECU 27, the primary processed information last-received by the communication device 71. The traveling control ECU 24 may also acquire other primary processed information received earlier than the latest primary processed information, together with the latest primary processed information. The plurality of pieces of primary processed information makes it possible to sense a change in the movement.

In Step ST63, the traveling control ECU 24 may acquire the own vehicle information from each part of the own vehicle. For example, the traveling control ECU 24 may acquire the current location and information on another surrounding mobile body from the detection ECU 26. In a case of the driving assist, the traveling control ECU 24 may acquire information on an operation performed by the user from the driving operation ECU 25.

In Step ST64, the traveling control ECU 24 may determine matching between the information and the actual current position. The traveling control ECU 24 may compare the current location detected by the own vehicle and the actual position included in the latest primary processed information. In a case where these positions match with a minor error that does not hinder the traveling control (Step ST64: YES), the traveling control ECU 24 may determine that the current positions match, and cause the process to proceed to Step ST65. In a case where an error between these positions is larger than the minor error (Step ST64: NO), the traveling control ECU 24 may determine that the current positions do not match, and cause the process to proceed to Step ST67.

In Step ST65, the traveling control ECU 24 may determine whether the course from the current position designated by the latest primary processed information is in an unobstructed state in which the own vehicle is able to travel. For example, the traveling control ECU 24 may determine, on the basis of the acquired peripheral information detected by the own vehicle, an obstacle, abnormality, presence or absence of risk, and presence or absence of another passing mobile body within the designated course or movable range. In a case where these hindrances are unlikely to be present (Step ST65: YES), the traveling control ECU 24 may determine that the designated course is unobstructed, and cause the process to proceed to Step ST66. In a case where a hindrance is present or likely to be present (Step ST65: NO), the traveling control ECU 24 may determine that the designated course or movable range is obstructed, and cause the process to proceed to Step ST67.

The traveling control ECU 24 may not only simply determine the unobstructedness of the designated course on the basis of the peripheral information detected by the own vehicle and acquired by the autonomous sensor. The traveling control ECU 24 may also compare the detection value of the autonomous sensor, and information included in the latest primary processed information. The traveling control ECU 24 may thus determine the unobstructedness of the designated course on the basis of an error between the detection value and the included information. In a case where a type of physical quantity or a coordinate system differs between the detection value of the autonomous sensor and information to be acquired externally, the traveling control ECU 24 may convert the physical quantity or the coordinate system of the externally acquired information, to make the information comparable with the detection value of the autonomous sensor. In this case, the traveling control ECU 24 may compare a value of a pseudo-sensor resulting from the conversion and the detection value of the autonomous sensor. In a case where the error is equal to or greater than a threshold (Step ST65: NO), the traveling control ECU 24 may determine that the designated course or movable range is obstructed, and cause the process to proceed to Step ST67. In a case where the error is less than the threshold (Step ST65: YES), the traveling control ECU 24 may determine that the designated course is unobstructed, and cause the process to proceed to Step ST66.

In Step ST66, the traveling control ECU 24 may control the traveling in accordance with the designated course.

The traveling control ECU 24 may generate, as the traveling control data, the designated course or a course within the designated movable range. In a case where a course represented by a vector including a direction and a distance or time has been acquired from the server 6, the traveling control ECU 24 may generate the traveling control data along the course. In a case where a safely movable range within which the own vehicle is able to travel has been acquired from the server 6, the traveling control ECU 24 may calculate a vector including a direction and a distance or time in which the own vehicle is able to travel at maximum within the safely movable range, and generate a course represented by the vector, as the traveling control data.

The traveling control ECU 24 may control the traveling of the own vehicle, on the basis of the generated traveling control data. In a case of the driving assist, the traveling control ECU 24 may adjust an operation performed by the user, to prevent the own vehicle from greatly deviating from the course based on the generated traveling control data. In the adjustment, the traveling control ECU 24 may adjust the operation performed by the user, to prevent the own vehicle from deviating from the designated movable range.

As described above, the traveling control ECU 24 may determine the course of the own vehicle and control or assist the traveling of the vehicle, on the basis of the primary processed information received by the terminal device 2 and obtained on the basis of the field information related to the movement of the plurality of mobile bodies.

In Step ST67, the traveling control ECU 24 may generate the traveling control data, on the basis of information independently detected by the autonomous sensor of the own vehicle, instead of the designated course. In the generation, the traveling control ECU 24 may use information on the designated course or movable range as subordinate information to obtain the traveling control data based on the autonomous sensor, and generate the traveling control data within the designated course or range.

The traveling control ECU 24 may control the traveling of the own vehicle, on the basis of the generated traveling control data. In a case of the driving assist, the traveling control ECU 24 may adjust an operation performed by the user, to prevent the own vehicle from greatly deviating from the course based on the generated traveling control data. In the adjustment, the traveling control ECU 24 may adjust the operation performed by the user, to prevent the own vehicle from deviating from the designated movable range.

As described above, the traveling control ECU 24 may, in the vehicle 100 serving as a mobile body, acquire the primary processed information received by the communication device 71, generate the traveling control data from the primary processed information, and control or assist the traveling of the vehicle 100 on the basis of the generated traveling control data. On the basis of the course designated in the acquired primary processed information, it is possible for the traveling control ECU 24 to execute determination or control of the movement of the vehicle, and control or assist the traveling of the vehicle 100. The traveling control data may serve as secondary processed information to be used for determination or control of the movement of the vehicle 100.

Unlike in the example embodiment, the terminal device 2 may receive information other than the information on the course or the movable range, for example, the field information, from the wireless base station 4. In this case, the traveling control ECU 24 may generate, on the basis of the information acquired by the reception, a course or a movable range by a process similar to that for the server 6, and execute the process illustrated in FIG. 9 on the basis of the course or the movable range. For example, the traveling control ECU 24 may generate, from the field information, information on a course or a movable range within which the own vehicle is able to travel in a short section, and execute the process illustrated in FIG. 9 on the basis of the generated information.

As described above, in the example embodiment, the server 6 may collect the field information related to the movement of the vehicles 100 serving as a plurality of mobile bodies. The server 6 may generate, on the basis of the collected field information, a course or a safely movable range in a short section for each of the mobile bodies. The courses or the safely movable ranges may allow the plurality of mobile bodies to travel therewithin safely without colliding with each other, for example. The server 6 may transmit the generated course or safely movable range in the short section to each of the communication devices 71 of the terminal devices 2, as the primary processed information. The communication device 71 of the terminal device 2 may be configured to receive, from the server 6, the primary processed information related to and usable in the corresponding mobile body. Consequently, it is possible for the communication device 71 to obtain course information related to the own movement generated in consideration of a course in accordance with which another mobile body moves. Each of the mobile bodies may obtain its own course information generated in consideration of a course in accordance with which another mobile body moves, and travel on the basis of the course information. This makes the mobile body less likely to be influenced by unpredicted movement of the other mobile body. The plurality of mobile bodies, such as vehicles, may thus move in accordance with common information, which enhances mutual safety during traveling.

Figure 10:
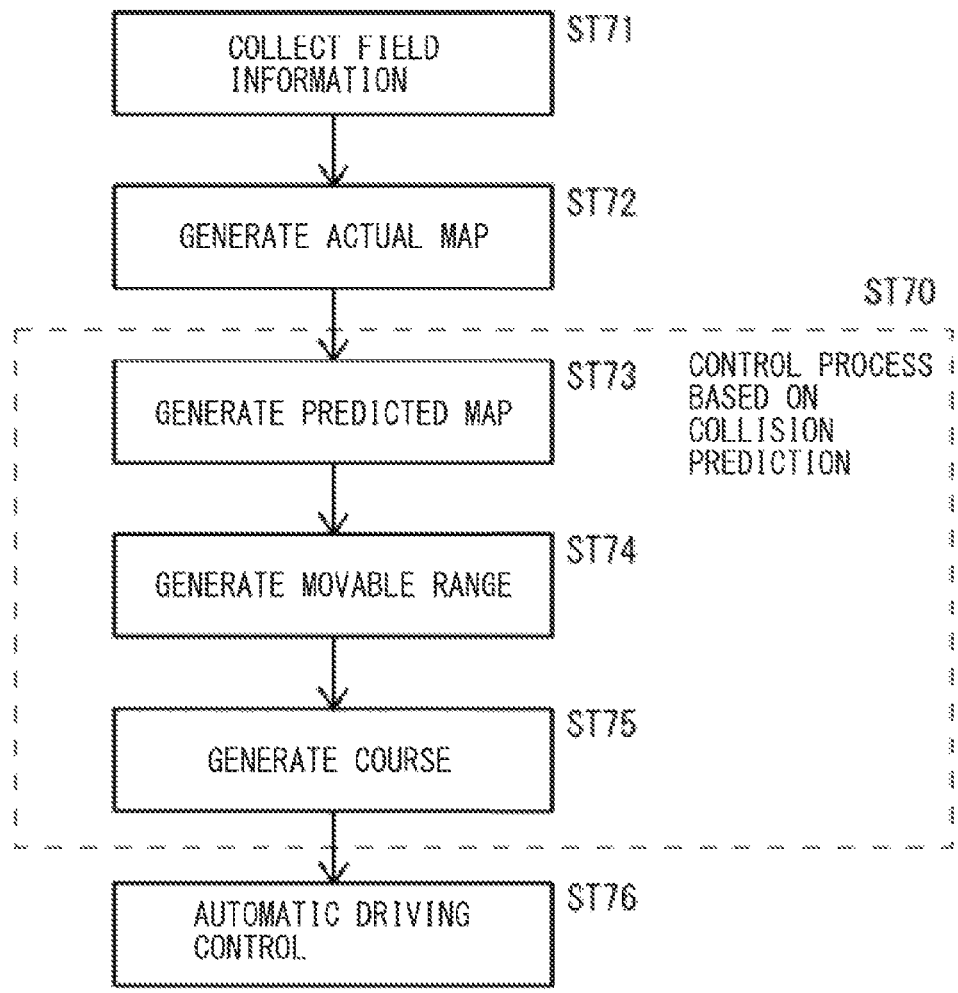
FIG. 10 is an explanatory diagram illustrating, in the mobility information provision system according to one example embodiment, a series of processes from obtaining course information related to traveling of the plurality of vehicles from field information related to the traveling of the plurality of vehicles, to controlling the movement of the plurality of vehicles.

FIG. 10 is an explanatory diagram illustrating, in the mobility information provision system 1 according to the first example embodiment, a series of processes from obtaining the course information related to the traveling of the vehicles 100 from the field information related to the traveling of the vehicles 100, to controlling the movement of the vehicles 100.

In Step ST71, the mobility information provision system 1 may collect the field information related to the traveling of the vehicles 100.

In Step ST72, the mobility information provision system 1 may obtain the actual positions of the vehicles 100, on the basis of the field information related to the traveling of the vehicles 100, and map the actual positions on the actual map.

In Step ST73, the mobility information provision system 1 may obtain the predicted positions of the vehicles 100, on the basis of the field information related to the traveling of the vehicles 100, and map the predicted positions on the predicted map.

In Step ST74, the mobility information provision system 1 may obtain a movable range or a designated course for each of the vehicles 100, on the basis of the actual map and the predicted map.

In Step ST75, the mobility information provision system 1 may obtain, from the movable range or the designated course for each of the vehicles 100, the course to be used by each of the vehicles 100 for control or determination.

In Step ST76, in the mobility information provision system 1, the vehicles 100 may each control the traveling of the own vehicle by the automatic driving, for example, along the course for the vehicle 100.

As described above, the mobility information provision system 1 may generate the actual map in Step ST72. By the processes from Step ST73 to Step ST75, the mobility information provision system 1 may generate information such as courses or movable ranges that allow the vehicles 100 to travel safely without collision. The vehicles 100 under control of the mobility information provision system 1 may each control the traveling of the own vehicle, on the basis of the corresponding information on the designated course or range. This enables the vehicles 100 under the control to travel safely without colliding with another mobile body. Thus, the processes from Step ST73 to Step ST75 may correspond to a control process based on collision prediction (Step ST70). The control process may be a process of predicting possibility of collision for each of the vehicles 100 on the basis of mapping data such as the actual map, and controlling, in a case where there is possibility of collision, the traveling of each of the vehicles 100 to prevent the collision from occurring.

In the first example embodiment, the server 6 coupled to the wireless base stations 4 may execute the processes from Step ST71 to Step ST74, and the control system 20 of the vehicle 100 may execute the processes from Step ST75 to Step ST76.

In another example, the server 6 may execute the processes from Step ST71 to Step ST72, execute the processes from the Step ST71 to Step ST73, or execute the processes from the Step ST71 to Step ST75. In this case, the server 6 may transmit the primary processed information generated by the processes to the terminal devices 2 of the vehicles 100. Each of the vehicles 100 may execute the process in Step ST76 in processes based on the primary processed information received by the terminal device 2, to control the traveling of the own vehicle.

Now described are some examples of the control process executed by the mobility information provision system 1 according to the example embodiment to control the movement of the vehicles 100. [First Example: Example in which mapping data including actual map and predicted map for each lane is used]

The mobility information provision system 1 according to the example embodiment may generate courses or movable ranges of the vehicles 100 for each road.

Some roads have several lanes directed in the same direction. The road traffic condition or the number of preceding vehicles may be different between the lanes. For example, the vehicles 100 are likely to be decelerated and congested at an exit or a junction of a highway.

An example that addresses such a situation is described below.

Figure 11A:
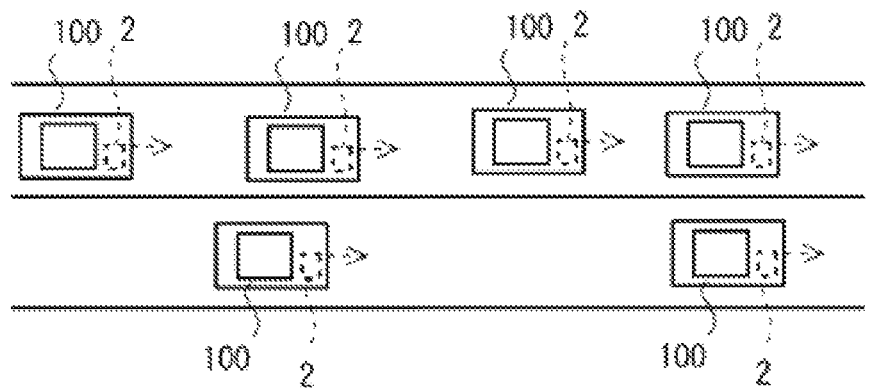
FIG. 11A is a diagram of a two-lane road for illustrating a process executed by the mobility information provision system to generate information on courses or movable ranges of the vehicles for each lane according to one example.
Figure 11B:
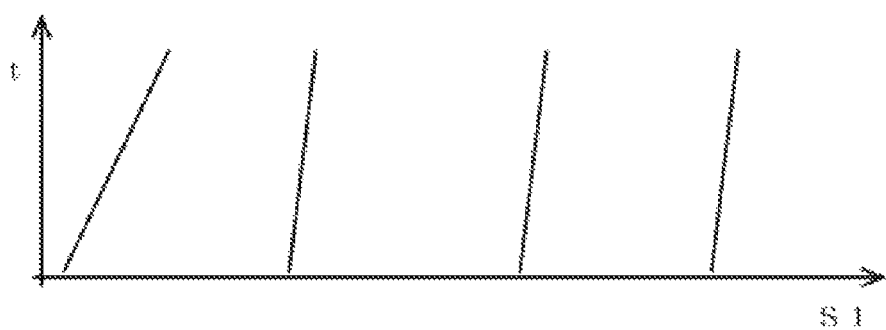
FIG. 11B is a vehicle operation diagram illustrating traveling conditions of the vehicles traveling on the first lane.
Figure 11C:
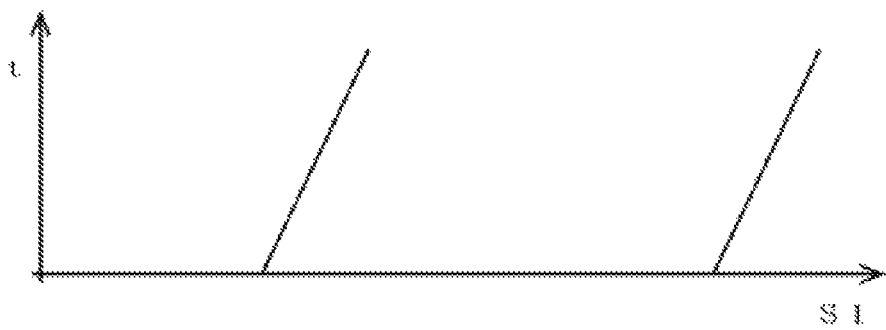
FIG. 11C is a vehicle operation diagram illustrating traveling conditions of the vehicles traveling on the second lane.

FIGS. 11A, 11B, and 11C illustrate a process executed by the mobility information provision system 1 to generate information on the courses or movable ranges of the vehicles 100 for each lane, according to a first example.

FIG. 11A illustrates a road having a first lane and a second lane on which the vehicles 100 are traveling in the same direction.

FIG. 11B is a vehicle operation diagram illustrating traveling conditions of the vehicles 100 traveling on the first lane.

FIG. 11C is a vehicle operation diagram illustrating traveling conditions of the vehicles 100 traveling on the second lane.

The vehicle operation diagrams of FIGS. 11B and 11C may each have a horizontal axis representing a position along the lane, a vertical axis representing time, and an origin point corresponding to a current time. Lines in the vehicle operation diagrams may indicate the movement of the vehicles 100. Each of the vehicles 100 may change its position while moving along the corresponding line over time from a current position corresponding to an intersection between the vertical axis and the horizontal axis. The actual map may be a combination of these vehicle operation diagrams for the respective lanes of the road, for example.

On the basis of the actual positions and the speeds included in the field information of the vehicles 100, the server 6 may generate the vehicle operation diagrams of FIGS. 11B and 11C that illustrate the traveling conditions of the vehicles 100 for the respective lanes. For example, the server 6 may select, on the basis of the positions or the history of the positions acquired from the vehicles 100, one vehicle operation diagram corresponding to the lane on which the vehicles 100 are actually traveling from the vehicle operation diagrams for the respective lanes. The server 6 may map an actual position or a predicted position of each of the vehicles 100 on the selected vehicle operation diagram on the basis of the time, position, speed, or acceleration rate acquired from the corresponding vehicle 100, for example.

The server 6 may generate information on the course or movable range of each of the vehicles 100 on the basis of the vehicle operation diagram so that each of the vehicles 100 is prevented from coming too close to the other vehicle 100 traveling in front of and behind the vehicle 100.

For example, in the vehicle operation diagram illustrated in FIG. 11B, first to third vehicles 100 in front in a traveling direction may be traveling from the left to the right of FIG. 11B at substantially the same speed. In contrast, a fourth vehicle 100, which is the closest to the origin point, may be traveling at a speed higher than those of the first, second, and third vehicles 100 traveling in front of the fourth vehicle 100. If these vehicles 100 keep traveling at this rate, the fourth vehicle 100 would collide with the third vehicle 100. The server 6 may predict and determine the possibility of such a collision on the basis of the mapping, and generate the information on the courses or the movable ranges that causes the first to fourth vehicles 100 to move avoiding the possible collision determined. For example, the server 6 may generate the information on the course or movable range of the first to third vehicles 100 that causes the first to third vehicles 100 to keep traveling at a current speed, and the information on the course or movable range of the fourth vehicle 100 that causes the fourth vehicle 100 to decelerate to the same speed as those of the first to third vehicles 100 traveling in front of the fourth vehicle 100. The automatic driving of the fourth vehicle 100 may then be controlled on the basis of the information received from the server 6 so that the fourth vehicle 100 decelerates to a specified speed within the movable range in which the fourth vehicle 100 is prevented from colliding with the third vehicle 100.

The server 6 may further calculate an average speed of the vehicles 100 for each lane and compare the average speeds. For example, the server 6 may preliminarily calculate and compare the average speeds of the vehicles 100 at a timing corresponding to the predicted map. In a case where the average speed is different among the lanes, the server 6 may generate the information on the course or movable range that causes the vehicle 100 traveling on the lane of a lower average speed to move to the lane of a higher average speed. In that case, the server 6 may generate the information on the course or movable range that causes the vehicle 100 to move to the lane of the highest average speed out of the lanes. For example, the server 6 may generate the course or movable range that causes the vehicle 100 to make a lane change at a decelerating or accelerating speed without coming too close to the other vehicles 100 traveling on the lane to which the vehicle 100 has moved.

The server 6 may transmit the generated course or movable range involving lane changing.

The control system 20 of the vehicle 100 may control or determine the travel of the own vehicle along the course or movable range transmitted from the wireless base station 4 to the terminal device 2. This may cause the vehicle 100 to make a lane change in response to an instruction. After making the lane change, the vehicle 100 is able to travel avoiding the traffic congestion or deceleration on the original lane.

For example, the traveling speeds and the average speed of the vehicles 100 traveling on the lane of FIG. 11B may be lower than those of the vehicles 100 traveling on the lane of FIG. 11C. In that case, the server 6 may instruct the fourth vehicle 100 traveling on the lane of FIG. 11B to make a lane change to the lane of FIG. 11C. In response to the instruction from the server 6, the fourth vehicle 100 illustrated in FIG. 11B may automatically execute, on the basis of the received information, the instructed lane change within the movable range in which the fourth vehicle 100 is prevented from colliding with the third vehicle 100, for example. Thereafter, the fourth vehicle 100 illustrated in FIG. 11B may be mapped as a third vehicle 100 newly added to the lane of FIG. 11C.

In the example control process described above, the information on the courses or movable ranges of the vehicles 100 may be generated so that the vehicles 100 traveling on the respective lanes are prevented from colliding with one another on the respective lanes.

Further, in the example control process described above, the information on the courses or movable ranges may be generated so that the vehicles 100 avoid traffic congestion.

Note that, in this example embodiment, the server 6 may generate the information on the courses or movable ranges involving lane changing by communicating with the wireless base stations 4 via the dedicated network 5 on the basis of the vehicle operation diagram indicating the traveling conditions.

In that case, the information on the courses or movable ranges involving lane changing is likely to be generated at a delayed timing when the vehicles 100 are traveling in a complicated flow, for example, when the vehicles 100 are merging at an exit or a junction of a highway. To address such a concern, multiple servers 6 may be assigned to the respective wireless base stations 4, and the information on the courses or movable ranges involving lane changing may be generated under the distributed control of the servers 6. This helps to minimize the transmission delay of the information.

Figure 12:
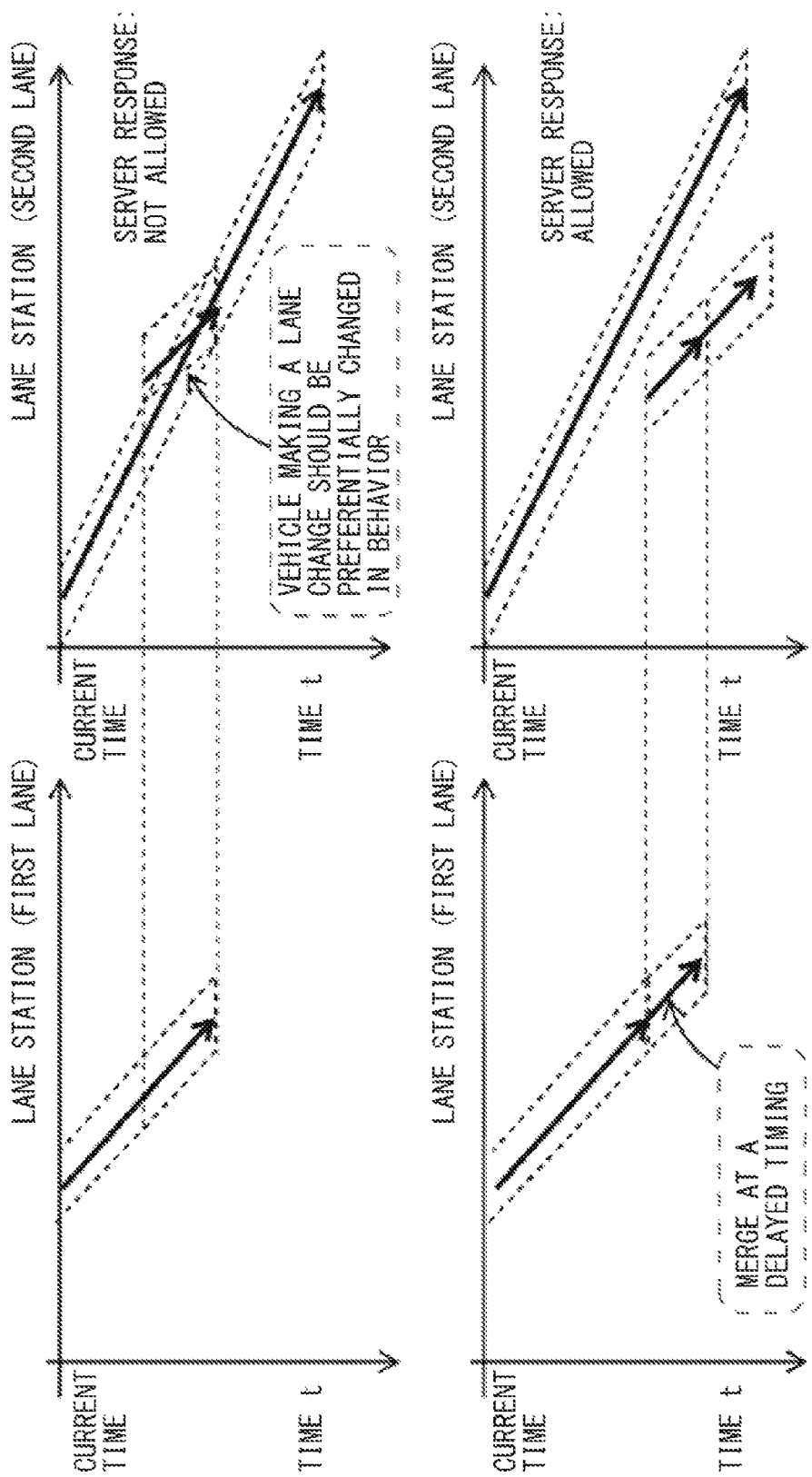
FIG. 12 is a diagram illustrating a space algorithm at the time of merging of the vehicles according to one example.

Second Example: Example in which Occupancy Area of Each Vehicle 100 is Taken into Consideration FIG. 12 is a diagram illustrating space algorithms of the vehicles 100 at the time of merging (lane changing) according to the example embodiment. The server 6 may include an actual map generator that changes the time of information received from an information storage into a server time to generate a map in the form of a plane coordinate system. The plane coordinate system may have a horizontal axis representing time, and a vertical axis representing a position. The plane coordinate system may represent a change in position of each vehicle 100 over time. In that case, a traveling area of each vehicle 100 may be calculated into a path or a traveling lane represented on a plane. A solid arrow may represent the moving state of the mobile body (the vehicle 100 in this example embodiment). The time may pass in a minus direction along the vertical axis. For example, the vertical axis may include an absolute time of an actual traveling. The horizontal axis extending in a plus direction may represent the lane. The slope of each solid arrow may represent the speed of the mobile body. That is, the solid arrows overlapping with each other along the horizontal axis may indicate interference between the vehicles 100, and the speed may decrease as the slope of the solid arrow becomes closer to vertical. An area defined by a broken line surrounding each solid arrow may represent the width of an occupancy area. The occupancy area may include the longitudinal length and the lateral length of a vehicle 100 and a margin. The interference may be prevented by giving the highest priority to a mobile body predicted to occupy a predetermined place at the earliest timing at a predicted traveling time has the highest priority out of the vehicles 100 traveling on the same lane. The direction of the solid arrow may correspond to the traveling direction of the vehicle 100.

A left part of FIG. 12 may correspond to the first lane serving as a merging lane, and a right part of FIG. 12 may correspond to the second lane serving as a main lane. In a case where a vehicle 100A traveling on the first lane tries to make a lane change to the second lane, the solid arrow in an upper left part of FIG. 12 corresponding to the vehicle 100A overlaps with the solid arrow in an upper right part of FIG. 12 corresponding to a vehicle 100B traveling on the second lane in a predicted traveling time period. This means that interference would occur between the vehicle 100A and the vehicle 100B. If the vehicle 100A makes a lane change to the second lane at a delayed timing as illustrated in a lower left part of FIG. 12, the solid arrow corresponding to the vehicle 100A does not overlap the solid arrow corresponding to the vehicle 100B in the predicted traveling time period as illustrated in a lower right part of FIG. 12. This means that no interference would occur between the vehicle 100A and the vehicle 100B. Accordingly, the vehicle 100A may be notified that the vehicle 100A should make a lane change to merge at a delayed timing.

Third Example: Example in which Vehicles are Caused to Move Avoiding Fallen Object In some cases, an obstacle, such as a fallen object, is lying on the road on which the vehicle 100 is moving. The obstacle lying on the road can hinder the movement of the vehicle 100. The server CPU 14 of the server 6 may thus need to stop the vehicle 100 in front of the obstacle such as a fallen object, for example. However, stopping the vehicle 100 can hinder the vehicle 100 from keeping moving under the control. Thus, the vehicle 100 has to move avoiding the obstacle only on the basis of determination by the occupant.

Even in such a case, the vehicle 100 is allowed to keep traveling under the control as long as possible, in the third example.

Figure 13:
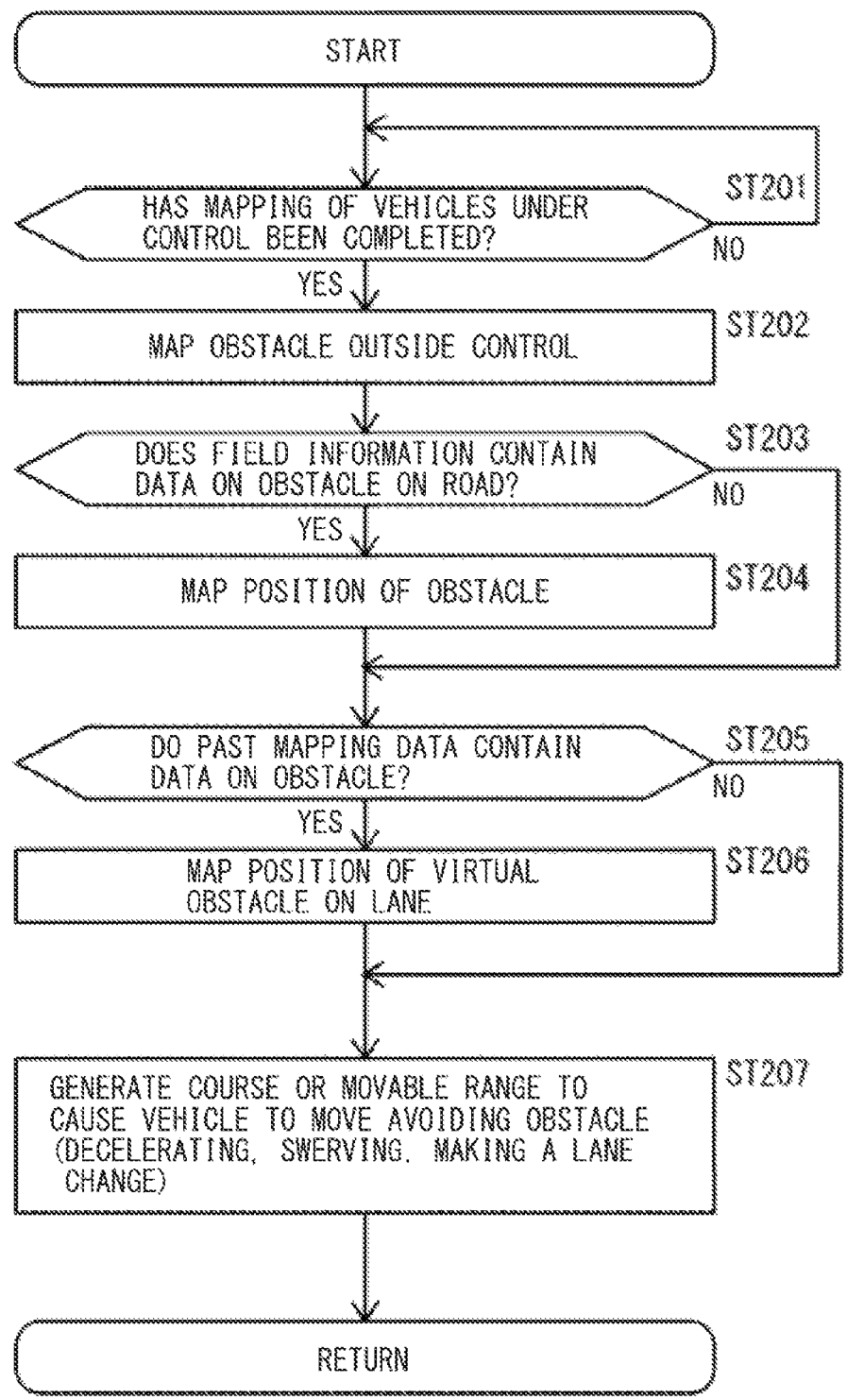
FIG. 13 is a flowchart illustrating a process, according to one example, of generating information on a course or a movable range of the vehicle that causes the vehicle to move avoiding an obstacle on the road.

FIG. 13 is a flowchart of a process, according to the third example, of generating the information on the course or movable range that causes the vehicle 100 to move avoiding the obstacle on the road.

The server CPU 14 of the server 6 illustrated in FIG. 2 may repeatedly execute the process illustrated in FIG. 13 as a part of the course generation process of FIG. 6.

In Step ST201, the server CPU 14 may determine whether the mapping of the vehicles 100 under the control has been completed. If the mapping of the vehicles 100 under the control has not been completed (Step ST201: NO), the server CPU 14 may repeat Step ST201. If the mapping of the vehicles 100 under the control has been completed (Step ST201: YES), the server CPU 14 may cause the process to proceed to Step ST202.

In Step ST202, the server CPU 14 may start to map an obstacle, such as another vehicle 100, outside the control.

In Step ST203, the server CPU 14 may determine whether the collected field information contains data on an obstacle on the road.

The field information may include a captured image of a road, for example. In that case, the server CPU 14 may determine the presence or absence of a fallen obstacle lying on the road on the basis of the captured image of the road. The field information may further include information on the obstacle or information on the position of the obstacle that are produced from the captured image of the road.

If the collected field information contains the data on an obstacle (Step ST203: YES), the server CPU 14 may cause the process to proceed to Step ST204. If the collected field information contains no data on an obstacle (Step ST203: NO), the server CPU 14 may cause the process to skip Step ST204 and proceed to Step ST205.

In Step ST204, the server CPU 14 may map the position of the obstacle lying on the road or lane that would hinder the movement of the vehicle 100.

In Step ST205, the server CPU 14 may determine whether the mapping data based on the field information collected in the past contains the data on an obstacle on the road.

For example, if it is determined on the basis of the trajectories of the vehicles 100 in the past mapping data that the vehicles 100 have moved off a certain point of the road or lane or that the vehicles 100 have not passed through a certain section of the road or lane, an obstacle is likely to lie at the certain point or section. The server CPU 14 may specify the point or section on the basis of the mapping data based on the field information collected in the past. The server CPU 14 may predict that there is an obstacle at the specified point or section of the road.

If it is predicted that there is an obstacle at the specified point or section of the road on the basis of the past mapping data (Step ST205: YES), the server CPU 14 may cause the process to proceed to Step ST206. If it is not predicted that there is an obstacle at the specified point or section of the road on the basis of the past mapping data (Step ST205: NO), the server CPU 14 may cause the process to skip Step ST206 and proceed to Step ST207.

In Step ST206, the server CPU 14 may map the virtual obstacle predicted to lie at the point or section that the vehicles 100 have moved avoiding in the past.

In Step ST207, the server CPU 14 may generate the movable ranges and the required courses of the vehicles 100 on the basis of the mapping data on the position of the obstacle on the road and the positions of the vehicles 100, e.g., the actual map or the predicted map described above or the mapping data illustrated in FIGS. 11B and 11C. At this time, the server CPU 14 may determine a possibility of interference with the other vehicle 100 or the obstacle. If there is the possibility of interference with the other vehicle 100 or the obstacle, the server CPU 14 may generate the information on the course or movable range that causes the vehicle 100 to move avoiding the other vehicle 100 or the obstacle by making a lane change or swerving.

If there is no possibility of interference with the other vehicle 100 or the obstacle, the server CPU 14 may generate the information on the course or movable range of the vehicle 100 in a normal way regardless of the other vehicle 100 or the obstacle.

The server CPU 14 may further determine the moving state or the moving environment of the vehicle 100, and change the way to avoid the obstacle in accordance with the determination. The way to avoid the obstacle may include, for example, swerving on the same lane, making a lane change to an adjacent lane, a combination of swerving and decelerating, or a combination of lane changing and decelerating. The server CPU 14 may generate the movable range and the required course that causes the vehicle 100 to move avoiding the position of the obstacle or the other vehicle 100 by making a lane change at a decelerating speed or swerving at a decelerating speed.

In the example embodiment, the moving state of the vehicle 100 may be, for example, the speed of the vehicle 100, the presence or absence of acceleration or deceleration, the rate of acceleration or deceleration, the presence or absence of a steering operation, the degree of a steering operation, or the yaw rate.

The moving environment may be, for example, the presence or absence of an adjacent lane, the shape of the road such as a curve, the weather, the time zone of a day, such as daytime or nighttime, or the period of time.

The server CPU 14 may choose an available or optimal way to avoid the obstacle depending on the moving state or the moving environment of the vehicle 100.

For example, the server CPU 14 may generate the information on the course or movable range of the vehicle 100 by selecting a lane to which the vehicle 100 is to move, out of a right lane and a left lane depending on the position or size of the obstacle lying on the lane on which the vehicle 100 is traveling.

In another case where the lane on which the vehicle 100 is traveling has a curve, for example, the server CPU 14 may generate the information on the course or movable range of the vehicle 100 by determining that the vehicle 100 is to make a lane change to another lane inside the curve.

By receiving the information on the course, the vehicle 100 traveling in the vicinity of the obstacle is allowed to pass by the obstacle without interfering with the obstacle. Accordingly, it is possible to move the vehicle 100 in safety avoiding the obstacle lying on the road by making a lane change or swerving.

Figure 14A:
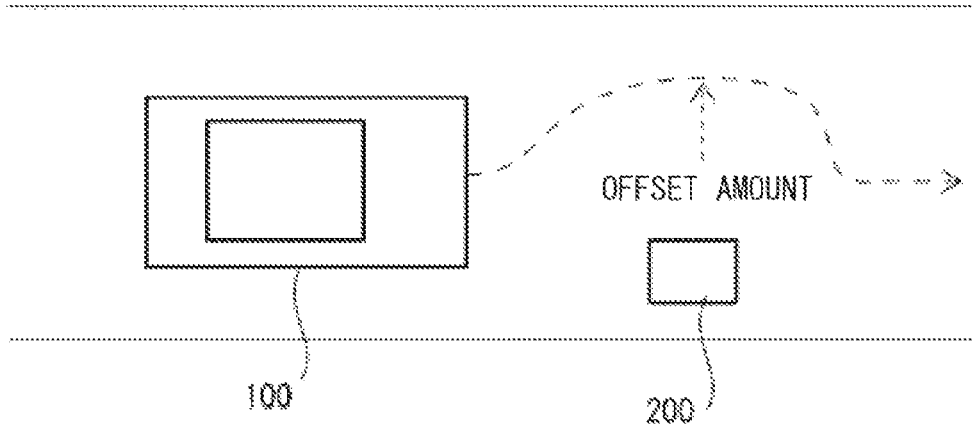
FIG. 14A is a schematic explanatory diagram for illustrating an example in which the vehicle is caused to travel avoiding the obstacle on the road through the process of FIG. 13.
Figure 14B:
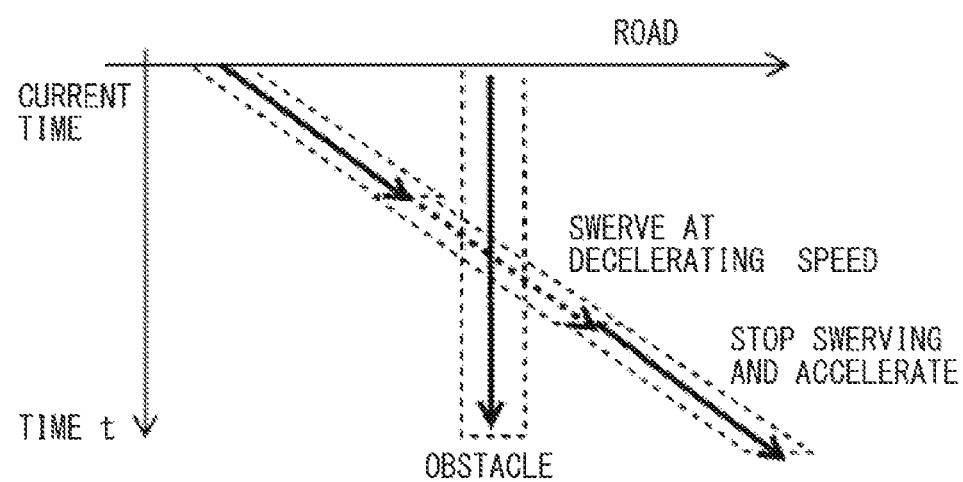
FIG. 14B is a vehicle operation diagram regarding the road illustrated in FIG. 14A.

FIGS. 14A and 14B illustrate an example in which the vehicle 100 is caused to move avoiding the obstacle lying on the road through the process of FIG. 13.

FIG. 14A is a schematic explanatory diagram of a road including the vehicle 100 under the control and a fallen object 200 outside the control, for example. The road illustrated in FIG. 14 may be a narrow, single-lane road.

FIG. 14B is a vehicle operation diagram regarding the road illustrated in FIG. 14A.

The vehicle operation diagram of FIG. 14B may have a horizontal axis representing a position along the narrow, single-lane road, a vertical axis representing time, and an origin point corresponding to a current time. The time may pass from the top to the bottom of FIG. 14B.

In the example illustrated in FIGS. 14A and 14B, the server CPU 14 may map the vehicle 100 under the control before Step ST201, and map the fallen object 200 outside the control in Step ST204 or Step ST206.

Thereafter, in Step ST207, the server CPU 14 may determine whether the vehicle 100 would contact and interfere with the fallen object 200 outside the control.

If the obstacle, such as the fallen object 200, lying on the lane would interfere with the vehicle 100, the server CPU 14 may generate a course that causes the vehicle 100 to stop in front of the obstacle.

The server CPU 14 may further determine whether the vehicle 100 is able to move avoiding the obstacle, such as the fallen object 200.

For example, in a case where the road has an adjacent lane, the server CPU 14 may generate a course that causes the vehicle 100 to avoid the obstacle by entering the adjacent lane at the position where the vehicle 100 would contact the fallen object 200 outside the control.

Alternatively, the server CPU 14 may determine whether the vehicle 100 is able to move avoiding the obstacle by swerving to the right or left on the same lane. If the vehicle 100 is able to move avoiding the obstacle by swerving on the same lane, the server CPU 14 may generate a course offset toward the right or left side of the traveling lane to avoid the obstacle. For example, the server CPU 14 may specify the offset direction from the right and left directions, and the amount of offset from the middle of the lane width.

In a case where the server CPU 14 generates the course that causes the vehicle 100 to move avoiding the obstacle, the server CPU 14 may set the course that causes the vehicle 100 to move avoiding the obstacle, rather than the course that causes the vehicle 100 to stop in front of the obstacle, as the course to be transmitted to the vehicle 100. In a case where the server CPU 14 generates the course that causes the vehicle 100 to move avoiding the obstacle by swerving, for example, the server CPU 14 may determine that the vehicle 100 would not contact and interfere with the fallen object 200.

In a case where the server CPU 14 does not generate the course that causes the vehicle 100 to move avoiding the obstacle, the server CPU 14 may set the course that causes the vehicle 100 to stop in front of the obstacle as the course to be transmitted to the vehicle 100.

In FIGS. 14A and 14B, the course involving swerving is indicated by a broken arrow, while the course not involving swerving is indicated by a solid arrow.

After the vehicle 100 passes by the fallen object 200 outside the control, the server CPU 14 may generate, in Step ST207, a course that causes the vehicle 100 to stop swerving and accelerate. For example, the server CPU 14 may generate a course extending in the middle of the lane width.

In this way, the vehicle 100 traveling in the vicinity of the fallen object 200 outside the control is allowed to move avoiding the fallen object 200 by swerving from the fallen object 200 at a decelerating speed, as illustrated in FIG. 14A. Accordingly, it is possible to keep moving the vehicle 100, as in the case of the absence of the fallen object 200.

The offset course generated by the server CPU 14 may conform to an actual shape of the road, may extend along a predetermined sub-course of the road for swerving, or may be a fixed course, for example.

The shape of the road may include, for example, the type of the road, the number of lanes, the width of the lanes, the structure, and the presence or absence of sidewalks and sidebands. For example, if the width of the road or lane on which the vehicle 100 is moving is equal to or larger than the total width of two vehicles 100, the vehicle 100 is likely to be able to pass by the fallen object 200. Even if the width of the lane on which vehicle 100 is moving is smaller than the total width of two vehicles 100, the vehicle 100 is likely to be able to pass by the fallen object 200 in consideration of the other lanes, sidewalks, and sidebands of the road. The server CPU 14 may acquire the attribute information of the road and determine whether the vehicle 100 is able to pass by the fallen object 200 on the basis of the attribute information. If the vehicle 100 is able to pass by the fallen object 200, the server CPU 14 may generate a course that causes the vehicle 100 to pass by the obstacle by swerving toward a side of the road opposite to the side of the road on which the fallen object 200 is lying.

Alternatively, the server CPU 14 may preliminarily acquire the attribute information of each road under the control, and determine whether the width of each road (e.g., lane) under the control is equal to or larger than the total width of two vehicles 100 on the basis of the acquired attribute information. If the width equal to or larger than two vehicles 100 is secured, the server CPU 14 may generate a sub-course for swerving. The sub-course for swerving may be set on the right or left side of an ordinary course extending in the middle of the width of the road or lane. For example, in a case where the fallen object 200 is lying on the road, the server CPU 14 may select the sub-course for swerving opposed to the fallen object 200 as a course that causes the vehicle 100 to pass by the fallen object 200 by swerving. In that case, the offset amount may be a fixed value or a variable value depending on the size of the fallen object 200 or the position of the fallen object 200 in the width direction of the road.

Still alternatively, the server CPU 14 may preliminarily assign a fixed offset value to each lane of the roads under the control. For example, a highway generally has sideroad bands in normal sections other than sections of bridges, tunnels, etc. The server CPU 14 may determine whether the road is a highway, and if the fallen object 200 is lying in the normal section of the highway, the server CPU 14 may routinely generate a course offset to the sideroad band.

According to the example embodiment described above, it is possible to move the vehicle 100 while ensuring safety in accordance with the situation.

In the example embodiment, for example, the obstacle that would hinder the movement of the vehicle 100 is mapped together with the positions of the vehicles 100. On the basis of the mapping, the information on the course or movable range that causes each of the vehicles 100 to move avoiding the obstacle is generated. Accordingly, even if an obstacle is lying on the road or lane on which the vehicles 100 are traveling, for example, it is possible to keep moving the vehicles 100 while ensuring safety in accordance with the situation.

Fourth Example: Example in which Warning Section is Set

If an obstacle such as a fallen object lying on the road on which the vehicle 100 is moving is detected at a delayed timing, the vehicle 100 is forced to make an abrupt change in moving state. Furthermore, some obstacles, such as animals or lightweight fallen objects including an umbrella, are likely to move under the influence of wind.

Figure 15:
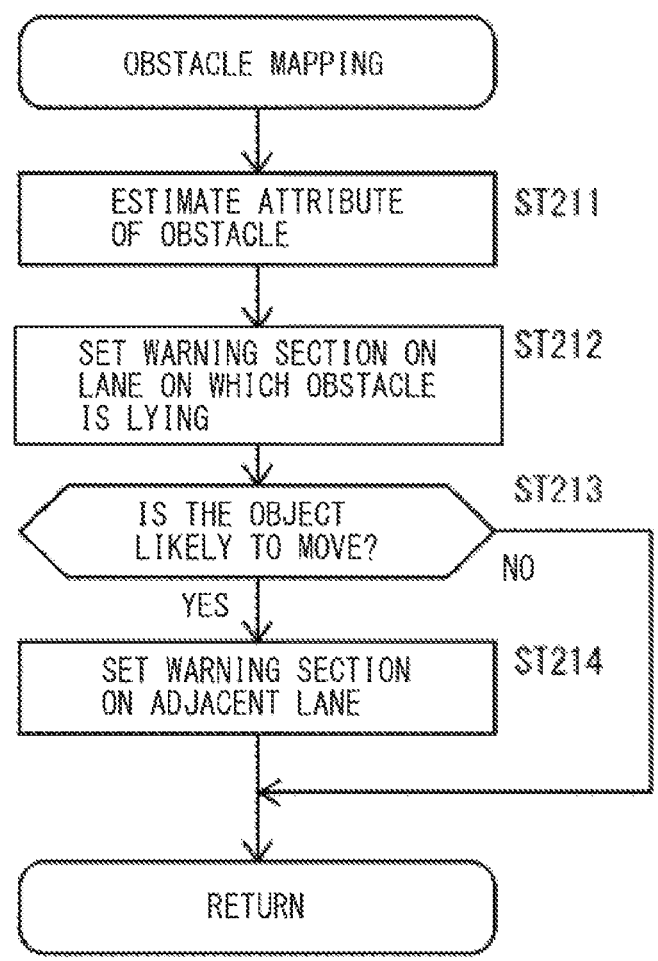
FIG. 15 is a flowchart illustrating a process of mapping an obstacle in one example.

FIG. 15 is a flowchart of a process of mapping an obstacle according to a fourth example.

The server CPU 14 of the server 6 illustrated in FIG. 2 may repeatedly execute the process illustrated in FIG. 15 in the obstacle mapping process in Step ST204 or Step ST206 of the flowchart in FIG. 13, for example.

In Step ST211, the server CPU 14 may estimate the attribute of the obstacle.

The field information may include a captured image of the road, for example. In that case, the server CPU 14 may determine the attribute, such as the type, of the fallen obstacle lying on the road on the basis of the captured image of the road. The field information may further include information on the attribute, such as the type, of the obstacle produced from the captured image of the road, and witness information on the obstacle.

In Step ST212, the server CPU 14 may set, on the lane on which the obstacle is lying, a warning section that the vehicle 100 is prevented from entering.

Out of a lane section in front of the obstacle and a lane section behind the obstacle, the server CPU 14 may set the warning section at least in the lane section in front of the obstacle.

The warning section set by the server CPU 14 may have a length corresponding to the attribute, such as the type, of the obstacle, the moving state of the vehicle 100, or the moving environment of the vehicle 100.

In Step ST213, the server CPU 14 may determine, on the basis of the attribute of the obstacle, whether the obstacle is likely to move.

In a case where the obstacle is an animal or a lightweight object, such as an umbrella, the obstacle may be determined as being likely to move.

If the obstacle is likely to move (Step ST213: YES), the server CPU 14 may cause the process to proceed to Step ST214. If the obstacle is unlikely to move (Step ST213: NO), the server CPU 14 may cause the process to skip Step ST214 and end the process.

In Step ST214, the server CPU 14 may set the warning section also on an adjacent lane.

Out of a lane section in front of the obstacle and a lane section behind the obstacle, the server CPU 14 may set the warning section at least in the lane section in front of the obstacle.

The warning section set by the server CPU 14 may have a length corresponding to the attribute, such as the type, of the obstacle, the moving state of the vehicle 100, or the moving environment of the vehicle 100.

In this way, the server CPU 14 may make the warning section larger when the obstacle is likely to move than when the obstacle is unlikely to move.

The server CPU 14 may determine whether the obstacle is likely to move, using a threshold. The threshold may be, for example, the weight of the obstacle, the surface area of the obstacle, the air volume, or a combination thereof. As the air volume or the surface area of the obstacle becomes larger and/or as the weight of the obstacle becomes smaller, the obstacle is more likely to move. In that case, the server CPU 14 may make the warning section larger when the likelihood of movement of the obstacle is equal to or higher than a predetermined threshold than when the likelihood of movement of the obstacle is lower than the predetermined threshold.

In such a case where the warning section is set around the position of the obstacle, the server CPU 14 may generate, in Step ST207 of FIG. 13, a course that causes the vehicle 100 to stop in or in front of the warning section.

The server CPU 14 may further determine whether the vehicle 100 is able to move avoiding the warning section.

For example, in a case where the warning section is not set on an adjacent lane, the server CPU 14 may generate a course that causes the vehicle 100 to avoid the obstacle by entering the adjacent lane at the position where the vehicle 100 would contact the fallen object 200 outside the control. In a case where the warning sections are set on all the lanes, the server CPU 14 may select a course that causes the vehicle 100 to move at a decelerating speed.

Alternatively, the server CPU 14 may determine whether the vehicle 100 is able to move avoiding the obstacle by swerving to the right or left on the same lane or the adjacent lane on which the warning section is set. If the vehicle 100 is able to move avoiding the obstacle by swerving, the server CPU 14 may generate a course offset toward the right or left side of the same lane or the adjacent lane to avid the warning section. For example, the server CPU 14 may specify the offset direction from the right and left directions, and the amount of offset from the middle of the lane width. The server CPU 14 may generate information on the course or movable range that causes the vehicle 100 to move avoiding the obstacle without passing through the warning section set around (e.g., in front of or behind) the position of the obstacle as far as possible.

In a case where the server CPU 14 generates the course that causes the vehicle 100 to move avoiding the warning section, the server CPU 14 may set the course that causes the vehicle 100 to move avoiding the warning section, rather than the course that causes the vehicle 100 to stop in front of the warning section, as the course to be transmitted to the vehicle 100. The server CPU 14 may give the highest priority to a course extending on a lane having no warning section. In a case where the warning sections are set on all the lanes, the server CPU 14 may select a course that causes the vehicle 100 to move at a decelerating speed. In a case where the server CPU 14 generates the course that causes the vehicle 100 to move avoiding the warning section by swerving, for example, the server CPU 14 may determine that the vehicle 100 would not contact and interfere with the fallen object 200.

In a case where the server CPU 14 does not generate the course that causes the vehicle 100 to move avoiding the warning section, the server CPU 14 may set the course that causes the vehicle 100 to stop in or in front of the warning section as the course to be transmitted to the vehicle 100.

Figure 16A:
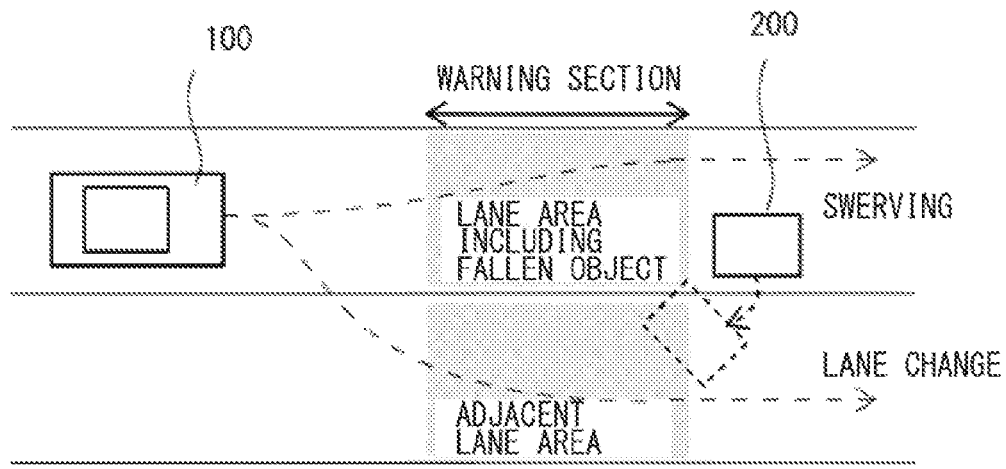
FIG. 16A is an explanatory diagram illustrating an example in which the vehicle is caused to travel avoiding an obstacle lying on the road through the process of FIG. 15.
Figure 16B:
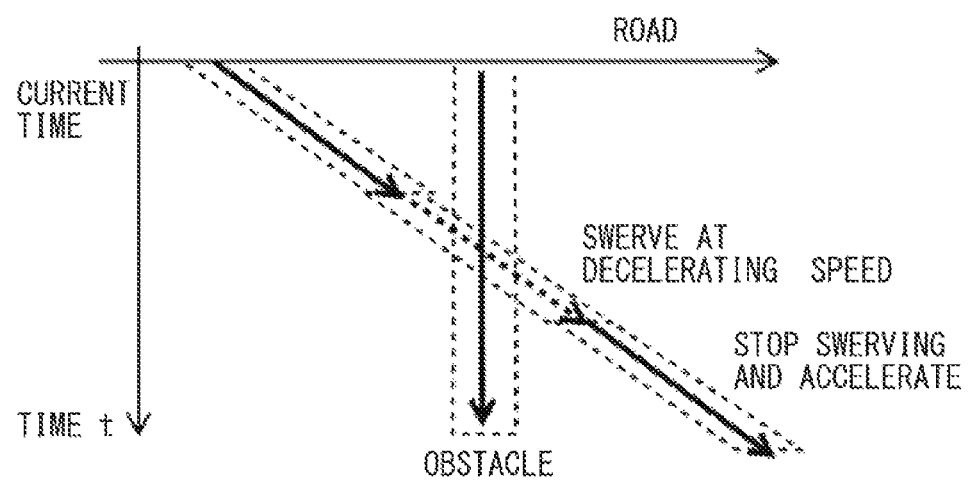
FIG. 16B is a vehicle operation diagram regarding the road illustrated in FIG. 16A.

In FIGS. 16A and 16B, the course involving swerving is indicated by a broken arrow, while the course not involving swerving is indicated by a solid arrow.

If there is no possibility of interference with the other vehicle 100 or the obstacle outside the control, the server CPU 14 may generate the information on the course or movable range of the vehicle 100 in a normal way regardless of the other vehicle 100 or the obstacle.

The server CPU 14 may further determine the moving state or the moving environment of the vehicle 100, and may change the way to avoid the obstacle in accordance with the determination. The way to avoid the obstacle may include, for example, swerving on the same lane, making a lane change to an adjacent lane, a combination of swerving and decelerating, or a combination of lane changing and decelerating. The server CPU 14 may generate the movable range and the required course that causes the vehicle 100 to move avoiding the position of the obstacle or the other vehicle 100 by making a lane change or swerving at a decelerating speed.

In the example embodiment, the moving state of the vehicle 100 may be, for example, the speed of the vehicle 100, the presence or absence of acceleration or deceleration, the rate of acceleration or deceleration, the presence or absence of a steering operation, the degree of a steering operation, or the yaw rate.

The moving environment may be, for example, the presence or absence of an adjacent lane, the shape of the road such as a curve, the weather, the time zone of a day, such as daytime or nighttime, or the period of time.

The server CPU 14 may choose an available or optimal way to avoid the obstacle depending on the moving state or the moving environment of the vehicle 100.

For example, the server CPU 14 may generate the information on the course or movable range of the vehicle 100 by selecting a lane to which the vehicle 100 is to move, out of a right lane and a left lane depending on the position or size of the obstacle on the lane on which the vehicle 100 is traveling.

In another case where the lane on which the vehicle 100 is traveling has a curve, for example, the server CPU 14 may generate the information on the course or movable range of the vehicle 100 by determining that the vehicles 100 is to make a change to another lane inside the curve.

By receiving the information on the course, the vehicle 100 traveling in the vicinity of the obstacle is allowed to pass by the obstacle without interfering with the obstacle. Accordingly, it is possible to move the vehicle 100 in safety avoiding the obstacle on the road by making a lane change or swerving.

FIGS. 16A and 16B illustrate an example in which the vehicle 100 is caused to move avoiding the obstacle lying on the road through the process of FIG. 15.

FIG. 16A is a schematic explanatory diagram of a road including the vehicle 100 and the fallen object 200, for example. The road illustrated in FIG. 16A may be a two-lane road. The fallen object 200 may lie on the lane on which the vehicle 100 is traveling. The fallen object 200 is likely to move to the adjacent lane under the influence of wind, for example.

FIG. 16B is a vehicle operation diagram regarding the road illustrated in FIG. 16A.

The vehicle operation diagram of FIG. 16B may have a horizontal axis representing a position along a narrow, single-lane road, a vertical axis representing time, and an origin point corresponding to a current time. The time may pass from the top to the bottom of the bottom of FIG. 16B.

In the example illustrated in FIGS. 16A and 16B, the server CPU 14 may map the vehicles 100 under the control before Step ST201, and map the fallen object 200 outside the control through the process of FIG. 15 executed in Step ST204 or Step ST206.

Thereafter, the server CPU 14 may set the warning section on the lane at a position in front of the fallen object 200 in Step ST212, and also set the warning section on the adjacent lane at a position in front of the fallen object 200 in Step ST214.

Thereafter, the server CPU 14 may generate a course that causes the vehicle 100 to swerve at a decelerating speed in the warning section to avoid the predicted position at which the vehicle 100 would contact the fallen object 200 outside the control. The server CPU 14 may specify the offset direction from the right and left directions, and the offset amount.

For example, in a case where the warning section is set on both of the lane on which the vehicle 100 is traveling and the adjacent lane, the server CPU 14 may generate a course that causes the vehicle 100 to swerve at a decelerating speed on the lane on which the vehicle 100 is traveling.

Alternatively, in a case where the warning section is set on both of the traveling lane on which the vehicle 100 is traveling and the adjacent lane, the server CPU 14 may generate a course that causes the vehicle 100 to make a lane change to the adjacent lane and swerve at a decelerating speed.

After the vehicle 100 passes by the fallen object 200 outside the control, the server CPU 14 may generate, in Step ST207, a course that causes the vehicle 100 to stop swerving and accelerate.

In a case where no warning section is set on the adjacent lane, the server CPU 14 may generate a course that causes the vehicle 100 to move avoiding the warning section by entering the adjacent lane at the position where the vehicle 100 would contact the fallen object 200 outside the control.

In this way, the vehicle 100 traveling in the vicinity of the fallen object 200 outside the control or the warning section is allowed to move avoiding the fallen object 200 without passing through the warning section as far as possible, as illustrated in FIG. 16A. Accordingly, it is possible to keep moving the vehicle 100, as in the case of the absence of the fallen object 200.

According to the example embodiment described above, it is possible to move the vehicle 100 while ensuring safety in accordance with the situation.

In the example embodiment, for example, the warning section may be mapped together with the obstacle that would hinder the movement of the vehicle 100. On the basis of the mapping, the information on the course or movable range that causes each of the vehicles 100 to move avoiding the obstacle and the warning section as far as possible is generated. Accordingly, even if an obstacle is lying on the road or lane on which the vehicles 100 are traveling, for example, the vehicles 100 are not forced to make abrupt control. For example, the vehicles 100 are able to take measures to avoid the obstacle lying on a curved road well in advance.

For example, the vehicle 100 may make a lane change depending on the road condition of a lane to which the vehicle 100 is to make a lane change, by effectively using the warning section. In the case of small traffic, for example, the vehicle 100 may make a lane change two kilometers before the warning section. In the case of heavy traffic on all the lanes, the vehicle 100 may make a lane change immediately before the obstacle.

In a case where the sensor performance deteriorates due to the weather or the period of time, for example, the vehicle 100 may make a lane change well in advance, e.g., two kilometers before the warning section by effectively using the warning section.

Fifth Example: Example in which Warning Section and Prohibited Section is Set

If an obstacle such as a fallen object lying on the road on which the vehicle 100 is moving is detected at a delayed timing, the vehicle 100 is forced to make an abrupt change in moving state. Furthermore, the vehicle 100 has to be prohibited from approaching the obstacle depending on the attribute of the obstacle.

Figure 17:
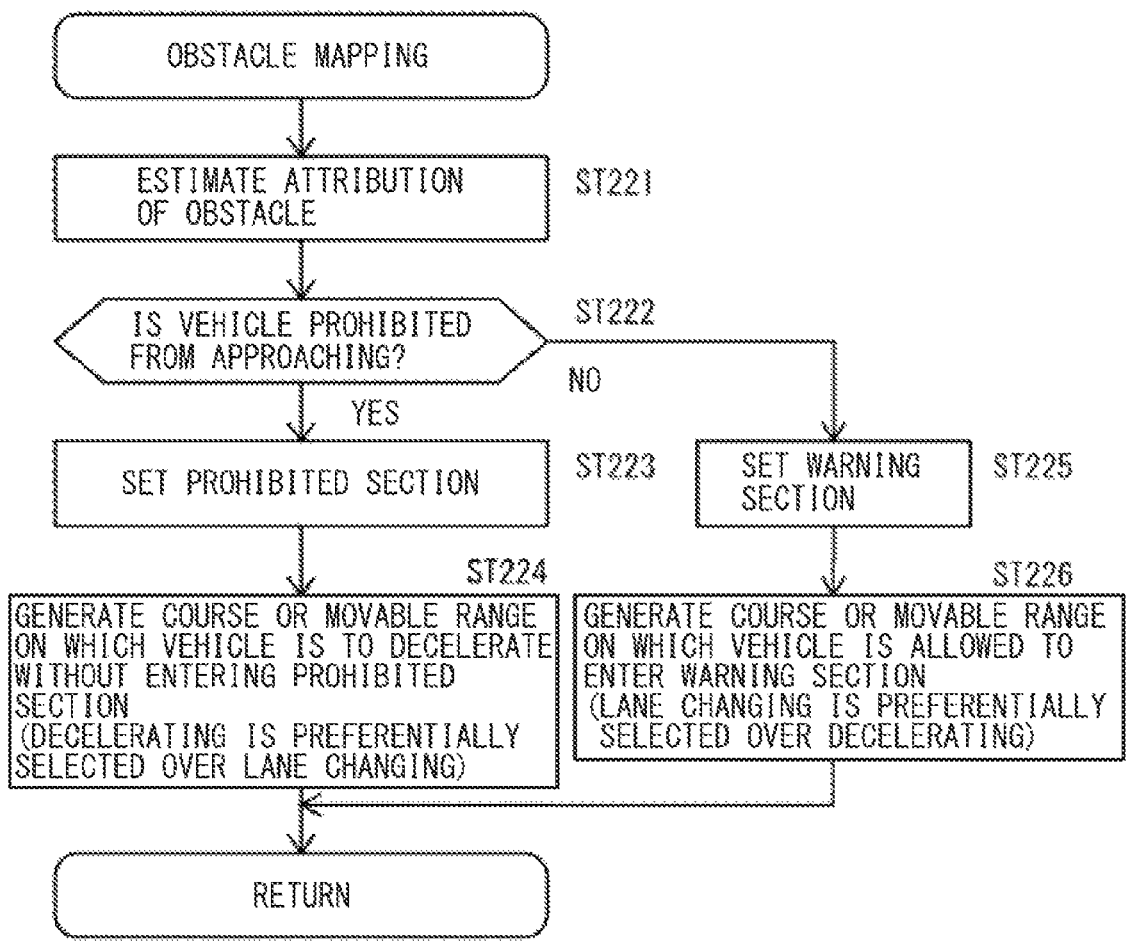
FIG. 17 is a flowchart illustrating a process of mapping an obstacle in one example.

FIG. 17 is a flowchart of a process of mapping an obstacle according to a fifth example.

The server CPU 14 of the server 6 illustrated in FIG. 2 may repeatedly execute the process illustrated in FIG. 17 in the obstacle mapping process in Step ST204 or Step ST206 of the flowchart in FIG. 13, for example.

In Step ST221, the server CPU 14 may estimate the attribute of the obstacle.

The field information may include a captured image of the road, for example. In that case, the server CPU 14 may determine the attribute, such as the type, of the fallen obstacle lying on the road on the basis of the captured image of the road. The field information may further include information on the attribute, such as the type, of the obstacle produced from the captured image of the road, and witness information on the obstacle.

In Step ST222, the server CPU 14 may determine, on the basis of the attribute of the obstacle, whether the vehicle 100 should be prohibited from approaching the obstacle.

Examples of the obstacle that the vehicle 100 should be prohibited from approaching may include a fuel tank and a fallen wheel. It is highly dangerous to approach these obstacles.

If the vehicle 100 should be prohibited from approaching the obstacle (Step ST222: YES), the server CPU 14 may cause the process to proceed to Step ST223. If the vehicle 100 should be prohibited from approaching the obstacle (Step ST222: NO), the server CPU 14 may cause the process to proceed to Step ST225.

In Step ST223, the server CPU 14 may set, on the lane on which the obstacle is lying, a prohibited section that the vehicle 100 is prohibited from approaching.

Out of a lane section in front of the obstacle and a lane section behind the obstacle, the server CPU 14 may set the prohibited section at least in the lane section in front of the obstacle.

The prohibited section set by the server CPU 14 may have a length corresponding to the attribute, such as the type, of the obstacle, the moving state of the vehicle 100, or the moving environment of the vehicle 100.

In Step ST224, the server CPU 14 may generate information on the course or movable range that causes the vehicle 100 to move completely avoiding the position of the obstacle and the prohibited section. For example, the server CPU 14 may select a course extending on a lane having no prohibited section. In a case where the prohibited sections are set on all the lanes, the server CPU 14 may select a course that causes the vehicle 100 to decelerate and stop in front of the prohibited section. The server CPU 14 may preferentially select the course that causes the vehicle 100 to decelerate and stop in front of the prohibited section over the course involving lane changing.

In Step ST225, the server CPU 14 may set, on the lane on which the obstacle is lying, the warning section that the vehicle 100 is prevented from approaching.

Out of a lane section in front of the obstacle and a lane section behind the obstacle, the server CPU 14 may set the warning section at least in the lane section in front of the obstacle.

The warning section set by the server CPU 14 may have a length corresponding to the attribute, such as the type, of the obstacle, the moving state of the vehicle 100, or the moving environment of the vehicle 100.

In Step ST226, the server CPU 14 may generate the information on the course or movable range that causes the vehicle 100 to move avoiding the obstacle without passing through the warning section as far as possible. For example, the server CPU 14 may select a course extending on a lane having no warning section. In a case where the warning sections are set on all the lanes, the server CPU 14 may select a course that causes the vehicle 100 to swerve at a decelerating speed. The server CPU 14 may preferentially select the course involving lane changing over the course involving swerving at a decelerating speed.

According to the example embodiment described above, it is possible to move the vehicle 100 move while ensuring safety in accordance with the situation.

In the example embodiment, for example, the warning section or the prohibited section may be mapped together with the obstacle that would hinder the movement of the vehicle 100. On the basis of the mapping, the information on the course or movable range that causes each of the vehicles 100 to move avoiding the obstacle and the warning section or the prohibited section is generated. Accordingly, even if a dangerous obstacle is lying on the road or lane on which the vehicles 100 are traveling, for example, the vehicles 100 are prohibited from approaching the dangerous obstacle.

Second Example Embodiment

In the first example embodiment described above, the vehicles 100 may be controlled by the mobility information provision system 1, and each of the vehicles 100 may control its own movement using the information received from the mobility information provision system 1, as appropriate.

When controlling its own travel on the basis of the own vehicle information, the control system 20 of the vehicle 100 in the mobility information provision system 1 may preferentially use the information acquired by the autonomous sensor over the information received from the wireless base station 4.

However, the autonomous sensor sometimes finds it difficult to exhibit sufficient detection accuracy due to the traveling environment. One possible solution to address such a concern is to add various autonomous sensors so that the control system 20 controls the travel of the vehicle 100 on the basis of comprehensive results of detection by these autonomous sensors. However, increasing the number of autonomous sensors of high detection performance without limitation is unfavorable for the manufacture of the vehicle 100. Moreover, such addition of various autonomous sensors does not necessarily secure sufficient detection accuracy in every traveling environment.

Described below is an example configuration to address such a circumstance.

Figure 18:
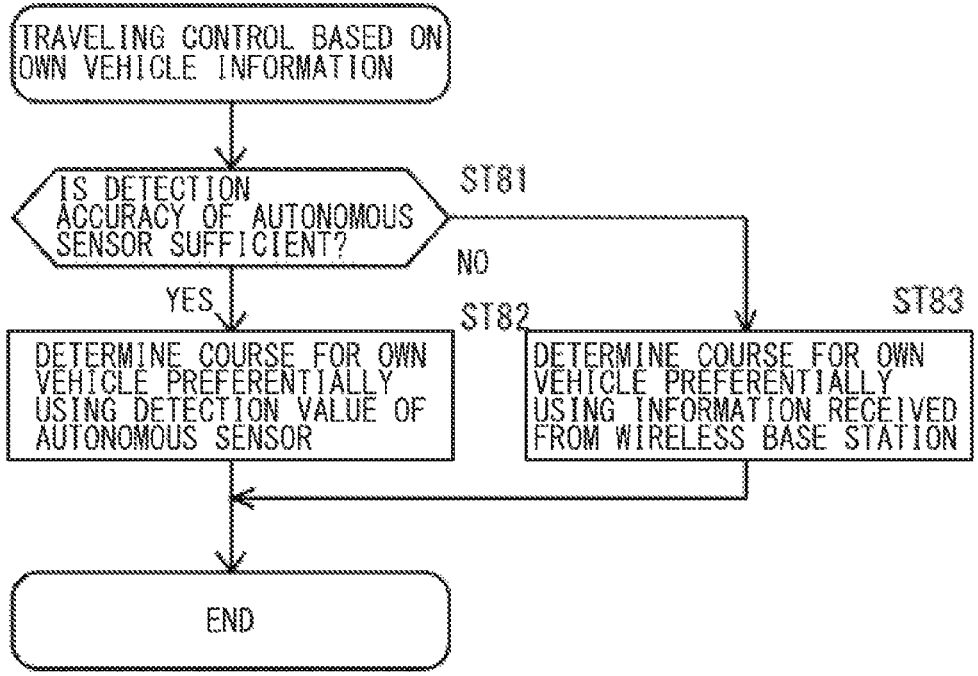
FIG. 18 is a flowchart illustrating a process in Step ST67 of FIG. 9 according to one example embodiment in detail.

FIG. 18 is a flowchart illustrating a process in Step ST67 of FIG. 9 in detail.

The process of FIG. 18 may be executed by the traveling control ECU 24 of the vehicle 100 in Step ST67 of FIG. 9.

In Step ST81, the traveling control ECU 24 may determine whether the autonomous sensor is able to exhibit sufficient detection accuracy. The autonomous sensor may be a stereo camera that captures an image of an environment in front of the vehicle 100, for example. The stereo camera sometimes finds it difficult to capture a clear image of a mobile body around the own vehicle, a lane of the road, or other objects due to backlight or any factors in the peripheral environment. If the captured image is clear, the traveling control ECU 24 may determine that the autonomous sensor is exhibiting sufficient detection accuracy (Step ST81: YES), and may cause the process to proceed to Step ST82. If the captured image is unclear, the traveling control ECU 24 may determine that the autonomous sensor is exhibiting insufficient detection accuracy (Step ST81: NO), and may cause the process to proceed to Step ST83.

In Step ST82, the traveling control ECU 24 may preferentially use the detection value of the autonomous sensor over the information received from the wireless base station 4 to determine a course for controlling the travel of the own vehicle.

In Step ST83, the traveling control ECU 24 may preferentially use the information received from the wireless base station 4 over the detection value of the autonomous sensor to determine the course for controlling the travel of the own vehicle. On the basis of the information received from the wireless base station 4, the traveling control ECU 24 may generate pseudo-sensor detection information in the same format and the same physical quantity as those of the detection information of the autonomous sensor. The traveling control ECU 24 may use the pseudo-sensor detection information to determine the course for controlling the travel of the own vehicle.

According to the second example embodiment described above, the information to be preferentially used may be switched between the detection value of the autonomous sensor and the information received from the wireless base station 4 depending on the detection accuracy of the autonomous sensor. Such a configuration according to the example embodiment addresses a temporal loss of the visual field.

For example, when image recognition by the stereo camera is hindered or falls below a threshold due to backlight, the control may be temporally executed preferentially using the world map over the information acquired by the stereo camera. The world map information may be bird's eye view information in a short period of time. Therefore, a past course of a preceding vehicle may be extracted from the world map information. Further, information acquired by the autonomous sensors of the other vehicles 100 may be reflected on the world map information.

In a case where the recognition rate of the autonomous sensor is inappropriate for use, e.g., 80% or less, the traveling control ECU 24 may compare the result of the recognition by the autonomous sensor with the world map information also for automatic brake control. If there is a difference between the result of the recognition by the autonomous sensor and the world map information, the traveling control ECU 24 may preferentially use the world map information over the result of the recognition by the autonomous sensor.

In another case where any of the autonomous sensors is exhibiting low detection accuracy, the traveling control ECU 24 may generate the pseudo-sensor detection information based on the world map information, and combine the pseudo-sensor detection information and the information acquired by the other autonomous sensors. On the basis of the combined information, the traveling control ECU 24 may determine the course for controlling the travel of the own vehicle 100.

Third Example Embodiment

In the second example embodiment described above, the control system 20 of the vehicle 100 in the mobility information provision system 1 may preferentially use the information acquired by the autonomous sensor over the information received from the wireless base station 4 when controlling the travel of the own vehicle on the basis of the own vehicle information.

However, the autonomous sensor sometimes finds it difficult to exhibit sufficient detection accuracy. For example, the autonomous sensor such as a stereo camera finds it difficult to exhibit sufficient detection accuracy in a case where the vehicle 100 is traveling in an environment in which the visual field is lost, such as a snow field or snowstorm environment. In such an environment, the vehicle 100 can lose its way and become unable to detect the direction to go and an oncoming vehicle suddenly appearing. Thus, the autonomous sensor can work improperly and capture an image only in a limited range.

Described below is an example configuration to address such a circumstance.

On the basis of the world map or the weather information received, the control system 20 of the vehicle 100 may determine a travel section in which the autonomous sensor is expected to fail to detect.

In a case where the vehicle 100 travels in this travel section, the control system 20 of the vehicle 100 may estimate the width of the road in which the vehicle 100 is allowed to travel on the basis of trees on both sides of the road, for example, and determine a course extending in a predicted direction in which the vehicle 100 is allowed to travel. The direction in which the vehicle 100 is allowed to travel may be predicted in the wireless base station 4 on the basis of the images transmitted from the terminal device 2 of the vehicle 100 to the server 6 and the wireless base station 4.

If it is determined that the visual field of the autonomous sensor is completely lost, the control system 20 of the vehicle 100 may preferentially use the pseudo-sensor detection information obtained from the received world map over the detection information of the autonomous sensor even in a case where the traveling control is executed on the basis of the own vehicle information. Note that, however, the detection information of the autonomous sensor may be preferentially used in terms of safety information, such as detection information of an actual collision. When traveling in a snowstorm zone, the vehicle 100 may be generally caused to travel at a speed as low as possible. The control system 20 of the vehicle 100 may determine a course of the vehicle 100 using the pseudo-sensor detection information obtained from the world map. In such a process, the control system 20 of the vehicle 100 may further acquire the number of other vehicles 100 traveling in the zone, actual positions of the other vehicles 100, and a timing at which each of the other vehicles 100 enters the zone, simulate traveling tracks of the other vehicles 100, and determine the course of the vehicle 100 on the basis of the simulated traveling tracks.

When an oncoming vehicle approaching the own vehicle is detected on the basis of the world map, the server 6 or the wireless base station 4 may warn both of the vehicles about the approach. This helps to avoid a collision between the vehicles.

In a case where the oncoming vehicle is outside the control of the mobility information provision system 1 and recognized outside the snowstorm zone, the server 6 or the wireless base station 4 may simulate a predicted passable zone which the own vehicle would pass through on the basis of a predicted time at which the own vehicle would pass by the oncoming vehicle and the traveling tracks of the other vehicles up to the current time. The server 6 or the wireless base station 4 may then warn the own vehicle not to cause interference in the passable zone. If it is difficult to avoid the interference, the simulation may be made so that the interference is avoided at least in a short period of time when the own vehicle passes by the oncoming vehicle.

In a case where the ongoing vehicle, which may be a motorcycle, is outside the control of the mobility information provision system 1 and recognized in the snowstorm zone for the first time, the server 6 or the wireless base station 4 may issue an urgent warning to the vehicles 100 traveling in a specific section, and update the world map. The simulation may be made focusing on ensuring safety (i.e., placing an emphasis on safety) on the basis of an increased number of uncertain factors of the mobile body moving fast. If a pedestrian such as a child is detected, the server 6 or the wireless base station 4 may notify the vehicle 100 traveling closest to the pedestrian of the presence of the pedestrian, and update the world map.

Fourth Example Embodiment

In the mobility information provision system 1 according to the foregoing example embodiments, the control system 20 of the vehicle 100 may control the travel of the own vehicle on the basis of the detection information of the autonomous sensor. In that case, even if the user presses down the accelerator pedal instead of the brake pedal by mistake despite that no pedestrian or no obstacle is recognized, the vehicle 100 is prevented from moving toward the pedestrian or the obstacle.

However, the autonomous sensor mounted on the vehicle 100 does not always work properly at any time. The autonomous sensor can work improperly due to aging degradation. If the detection by the autonomous sensor is improper due to the traveling environment, e.g., backlight or light from an oncoming vehicle traveling in the night, the control system 20 of the vehicle 100 can find it difficult to control the travel of the own vehicle properly on the basis of the detection information of the autonomous sensor.

Described below is an example configuration to address such a circumstance.

The control system 20 of the vehicle 100 may determine whether the detection information of the autonomous sensor is proper. For example, in a case where an image captured by the stereo camera is entirely dark or white, the control system 20 of the vehicle 100 may determine that the detection information of the autonomous sensor is improper. In such a case, the control system 20 of the vehicle 100 may confirm, on the basis of the world map information, the presence of another mobile body moving in the traveling direction. If the other mobile body moving in the traveling direction is confirmed on the basis of the world map information, the control system 20 of the vehicle 100 may determine that there is the other mobile body moving in the traveling direction even though the control system 20 has not confirmed the other mobile body moving in the traveling direction on the basis of the detection information of the autonomous sensor. The control system 20 of the vehicle 100 may then execute the traveling control based on the determination. The control system 20 of the vehicle 100 may execute brake control that stops the vehicle 100 on the basis of the pseudo-sensor detection information obtained from the world map.

For example, in a situation where a pedestrian and another vehicle are recognized on the basis of the world map but are not recognized by the automatic sensor of the own vehicle, the control system 20 of the vehicle 100 may determine the situation and use the pseudo-sensor detection information.

In a case where the determination has been retained for a given time or made in predetermined number of times or more, the control system 20 of the vehicle 100 may set the level of reliability of the pseudo-sensor detection information to a high level. Using the pseudo-sensor detection information set at a high reliability level, the control system 20 of the vehicle 100 may select a course or a time difference that causes the vehicle 100 to avoid interference with the pedestrian or the moving direction of the pedestrian that the autonomous sensor has failed to recognize. On the basis of the course or time difference selected, the control system 20 of the vehicle 100 may execute the traveling control.

Fifth Example Embodiment

In the foregoing example embodiments, the control system 20 of the vehicle 100 in the mobility information provision system 1 may switch the operation mode between the automatic driving mode and the driving assist mode that assists the manual driving by the user.

The user of the vehicle 100 needs to take responsibility also for the travel in the automatic driving mode.

For example, when the operation mode of the vehicle 100 is switched from the automatic driving mode to the driving assist mode while the vehicle 100 is traveling, the user needs to take responsibility for operations before and after the switching. Therefore, it is necessary to control the travel of the vehicle 100 so that responsibility for compensation is not generated for the user during the travel in the automatic driving mode including the timing of switching to the driving assist mode.

For example, the user can be in a demanding situation forcing the user to perform a hard braking operation immediately after switching of the operation mode of the vehicle 100 from the automatic driving mode to the driving assist mode. If such a situation actually happens, it can be hard for the user to fully press down the brake pedal.

Described below is an example embodiment that addresses such a concern.

The control system 20 of the vehicle 100 may repeatedly evaluate the reliability of the world map transmitted from the server 6 to the terminal device 2 while the vehicle 100 is traveling. If the reliability of the received world map is low, the control system 20 of the vehicle 100 may prohibit the operation mode of the vehicle 100 from being switched from the manual operation mode to the automatic driving mode.

The control system 20 of the vehicle 100 may repeatedly compare the pseudo-sensor detection information obtained from the world map with the detection information of the autonomous sensor while the vehicle 100 is traveling in the automatic driving mode. In a case where a difference between the pseudo-sensor detection information and the detection information of the autonomous sensor is equal to or greater than a threshold, the control system 20 of the vehicle 100 may refrain from using the pseudo-sensor detection information obtained from the world map. The control system 20 of the vehicle 100 may use the detection information of the autonomous sensor to control the vehicle 100 traveling in the automatic driving mode.

In case of any disturbance, the control system 20 of the vehicle 100 may terminate the automatic driving mode and execute control to switch the operation mode of the vehicle 100 from the automatic driving mode to the manual driving mode. To achieve the switching control, the control system 20 of the vehicle 100 may first control the travel of the own vehicle so that an inter-vehicle distance between the own vehicle and a preceding vehicle is increased. The inter-vehicle distance between the own vehicle and the preceding vehicle may be determined depending on the speed. When the autonomous sensor detects that a predetermined inter-vehicle distance is secured, the control system 20 of the vehicle 100 may notify the user that the automatic driving mode is going to be switched to the manual driving mode. For the detection, the control system 20 of the vehicle 100 may refrain from using the world map information. A few seconds later, the control system 20 of the vehicle 100 may actually switch the operation mode from the automatic driving mode to the manual driving mode.

Securing the inter-vehicle distance between the own vehicle and the preceding vehicle helps to reduce the necessity of a hard braking operation by the user immediately after switching of the operation mode of the vehicle 100 from the automatic driving mode to the driving assist mode. This allows the user to be notified well in advance of switching from the automatic driving mode to the manual driving mode, enabling the user to prepare for starting the manual driving. Accordingly, an urgent circumstance forcing the user to perform a hard braking operation immediately after switching to the manual driving mode is unlikely to occur.

Sixth Example Embodiment

In the foregoing example embodiments, the server 6 collects the field information from the vehicles 100 moving in a predetermined zone or section in charge, performs mapping, generates information to be used for determining or controlling the movement of the vehicles 100, and transmits the information to each of the vehicles 100. Each of the vehicles 100 may determine or control its movement using the information received from the server 6.

Alternatively, part or all of the processing executed by the server 6 in the foregoing example embodiments may be executed by each of the vehicles 100, for example. For instance, each of the vehicles 100 collects the field information from the other vehicles 100 as illustrated in FIG. 7, performs mapping on the actual map or the predicted map, generates the information on the movable range or the course to be used for determining or controlling the movement of the own vehicle, and uses the information to determine or control the movement of the own vehicle, e.g., to execute the automatic driving. In that case, the server 6 and the wireless base stations 4 may be used to exchange data between the vehicles 100. Each of the wireless base stations 4 may be provided in a predetermined zone or section in which the vehicle 100 are to move, and communicate with the terminal device 2 used in the vehicle 100 moving in the predetermined zone or section in charge.

In that case, the server 6 may generate primary processed information based on the field information, and transmit the primary processed information.

The terminal device 2 of the vehicle 100 may receive the information generated by the server 6 via the wireless base station 4.

On the basis of the field information or the primary processed information received by the terminal device 2, the control system 20 of the vehicle 100 may generate secondary processed information serving as traveling control data.

The term "primary processed information" used herein may refer to information generated by the server 6 on the basis of the field information. The term "secondary processed information" may refer to information generated by the control system 20 of the vehicle 100 on the basis of the field information or the primary processed information.

Figure 19:
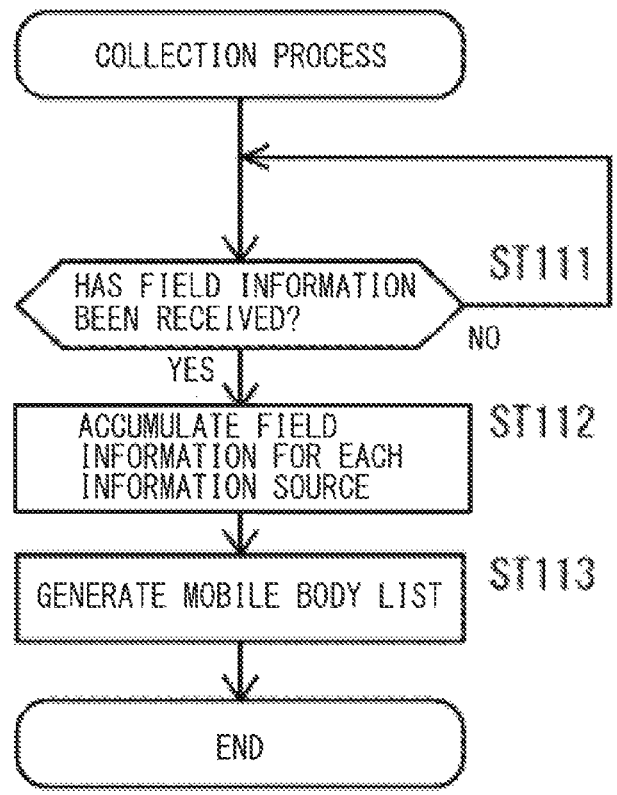
FIG. 19 is a flowchart illustrating a process executed by a server to collect field information on the movement of the vehicles according to one example embodiment.

FIG. 19 is a flowchart of a process executed by the server 6 according to the example embodiment to collect the field information on movement of the vehicles 100.

The server CPU 14 of the server 6 may repeatedly execute the collection process of FIG. 19 each time the server communication device 11 of the server 6 receives new field information.

In Step ST111, the server CPU 14 may determine whether the server communication device 11 has received the field information. The field information may include, for example, the own vehicle information transmitted by the terminal devices 2 of the respective vehicles 100, and the detection information acquired by detectors such as cameras installed on a road. A non-illustrated server of an advanced traffic system may transmit, to the server 6, traffic information of the region to be managed. The server communication device 11 may receive these pieces of information. If the server communication device 11 has not received the field information (Step ST111: NO), the server CPU 14 may repeat Step ST111. If the server communication device 11 has received the field information (Step ST111: YES), the server CPU 14 may cause the process to proceed to Step ST112.

In Step ST112, the server CPU 14 may classify the received field information according to the information sources and accumulate the classified pieces of field information into the server memory 13. The server memory 13 of the server 6 may thereby accumulate and record the field information on the movement of the vehicles 100. The field information may include information received from the respective vehicles 100, such as information on the vehicles 100 and the users, information on peripheral environments, and traffic information on the region in which each of the vehicles 100 is moving. The server CPU 14 may record a reception time of each piece of field information in connection with the corresponding piece of the field information received.

In Step ST113, the server CPU 14 may generate the mobile body list on the basis of the received field information. The mobile body list may include data on the vehicles 100 to which the server 6 needs to send the information at present. The mobile body list may also include data on other mobile bodies or vehicles 100 to which the server 6 does not need to send the information, in such a manner that the vehicles 100 to which the server 6 needs to send the information are distinguishable from the vehicles 100 to which the server 6 does not need to send the information.

Figure 20:
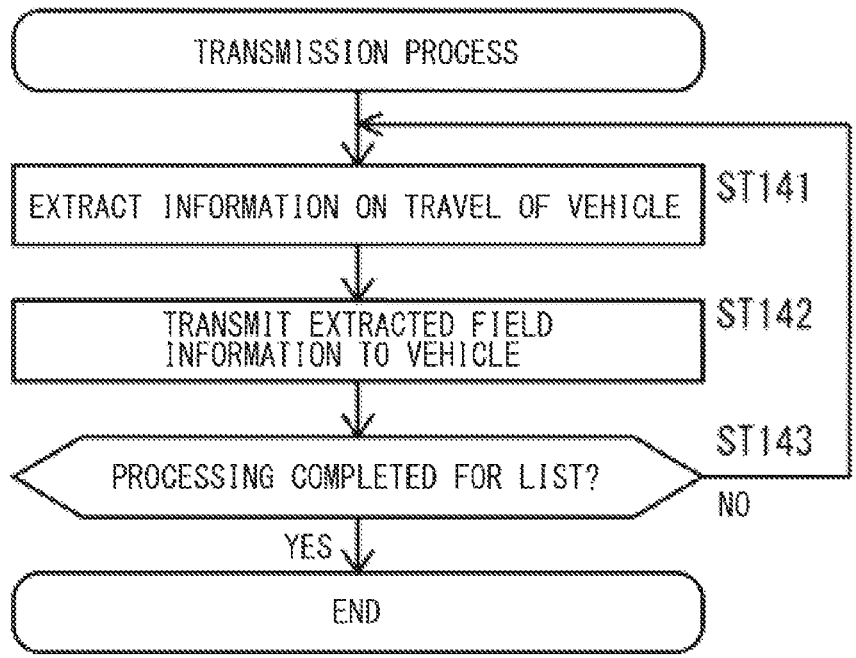
FIG. 20 is a flowchart illustrating a process executed by a server to transmit the collected field information according to one example embodiment.

FIG. 20 is a flowchart illustrating a process executed by the server according to the example embodiment to transmit the collected field information.

The server CPU 14 of the server 6 may repeatedly execute the transmission process of FIG. 20.

In Step ST141, the server CPU 14 may extract the information related to the travel of each of the vehicles 100 from the pieces of the field information recorded in the server memory 13. The server CPU 14 may extract the information related to the travel of any of the vehicles 100 together with the information related to the travel of a preceding vehicle in front of the vehicle 100.

In Step ST142, the server CPU 14 may cause the server communication device 11 to transmit the extracted field information to the communication device 71 of the corresponding vehicle 100. The field information may be transmitted from the server 6 to the wireless base station 4 via the dedicated network 5, and then transmitted from the wireless base station 4 to the terminal device 2 of the corresponding vehicle 100. The wireless base stations 4 may thereby transmit the field information to the terminal devices 2 in the respective vehicles 100.

In Step ST143, the server CPU 14 may determine whether the transmission process has been completed for all the vehicles 100 in the mobile body list. If the transmission process has not been completed for all the vehicles 100 in the mobile body list (Step ST143: NO), the server CPU 14 may cause the process to return to Step ST141. The server CPU 14 may select the vehicle 100 to be processed next and repeat the transmission process from Step ST141 to Step ST143. If the transmission process has been completed for all the vehicles 100 in the mobile body list (Step ST143: YES), the server CPU 14 may end the transmission process of FIG. 20.

In this way, the server 6 may transmit, to the vehicles 100, the field information used for controlling or determining the movement of the vehicles 100. For example, the server 6 may transmit the mobile body list and the primary processed information indicating the traveling direction and the traveling speed of each vehicle 100 together with the field information. The primary processed information may further include information for verification, such as data on an actual position, a current time, and a predicted time after a short period of time from the current time. The server 6 may repeat the processes of FIGS. 19 and 20 to keep transmitting the field information related to a course in a short section to the vehicles 100 in a repeated manner.

Optionally or alternatively, the server 6 may transmit the field information collected from the vehicles 100 to each of the vehicles 100 together with or instead of the extracted field information.

After receiving the field information from the server 6, each of the vehicles 100 may execute the course generation process of FIG. 6 to generate the information on the course of the own vehicle. Note that, in that case, it is not necessary to execute the process of Step ST24 because each of the vehicles 100 has already received the mobile body list or the information based on the mobile body list from the server 6.

Further, each of the vehicles 100 may execute the process of FIG. 9 using the information on the course of the own vehicle generated by the own vehicle to control the travel of the own vehicle.

According to the example embodiment described above, the server 6 collects the field information on the movement of the mobile bodies or vehicles 100, and transmits the collected field information to each of the vehicles 100. Thereafter, each of the vehicles 100 may determine and control the movement of the own vehicle based on the information common to the vehicles 100. On the basis of the information common to the vehicles 100, each of the mobile bodies or vehicles 100 may generate and use the course or the safely movable range in a short section that causes the vehicle 100 to travel avoiding a collision with the other vehicles 100. Accordingly, each of the vehicles 100 is less susceptible to unexpected movement of the other vehicles 100, enhancing mutual safety during the travel of the vehicles 100.

In this example embodiment, the processing executed by the server 6 in the first example embodiment may be performed by each vehicle 100. Similarly, the processing executed by the server 6 in the second to fifth example embodiments may be executed by each vehicle 100 in this example embodiment. In that case, the processing executed by the server 6 in the foregoing example embodiments may be read as the processing executed by the control system 20 of each vehicle 100. According to this example embodiment, the processing may be executed by the control system 20 of each vehicle 100, rather than by the server 6, in a distributed or individual manner. Each vehicle 100 may execute processing for its own vehicle. Optionally, any of the vehicles 100 may execute processing for another of the vehicles 100 and transmit a result of the processing on behalf of the other vehicle 100 depending on the capacity, for example.

In such a case, the control system 20 of each vehicle 100 may execute all or part of the processing executed by the server 6 in the foregoing example embodiments.

In one example, the server 6 may relay the field information received from the vehicles 100 to each of the vehicles 100. In this example, the control system 20 of each vehicle 100 may execute all the processing—including collecting the field information from the vehicles 100—executed by the server 6 in the foregoing example embodiments.

In another example, the server 6 may receive and collect the field information from the vehicles 100, and transmit the collected field information to each of the vehicles 100. In this example, the control system 20 of each vehicle 100 may execute the processing—after collecting the field information from the vehicles 100—executed by the server 6 in the foregoing example embodiments.

In still another example, the server 6 may receive and collect the field information from the vehicles 100, and perform mapping on the mapping data including the actual map and the predicted map. In this example, the control system 20 of each vehicle 100 may execute the processing subsequent to the processing based on the mapping data described in the foregoing example embodiments.

In either example, the server 6 of the mobility information provision system 1 according to the foregoing example embodiments or the modification examples may collect or relay the field information on the movement of the vehicles 100 moving in a predetermined zone or section under the control of the mobility information provision system 1, in communication with the terminal devices 2 to be used in the respective moving vehicles 100. The server 6 may communicate with the terminal devices 2 usable in the respective mobile bodies or vehicles 100 via the plurality of wireless base stations 4 serving as communication apparatuses. The server 6 may be an integrated server as in the foregoing example embodiments, or may include a plurality of servers 6 distributed to the respective wireless base stations 4, for example. The vehicles 100 or the server 6 may map the collected or relayed field information on the movement of the vehicles 100 on the mapping data, and generate information for determining or controlling the movement of the vehicles 100 on the basis of the mapping data. Alternatively, the vehicles 100 and the server 6 may perform the mapping process and the information generation process in a shared manner. Each of the vehicles 100 may then move on the basis of the information generated for each of the vehicles 100. Accordingly, it is possible to move the vehicles 100 in safety without causing a collision one another.

It should be understood that the foregoing example embodiments of the technology are mere example, and the technology should not be limited thereto. Various modifications or changes may be made without departing from the gist of the technology.

For example, in the foregoing example embodiments, the server 6 and the control system 20 of each vehicle 100 in the mobility information provision system 1 may operate in cooperation with each other to execute the series of processes described in the foregoing example embodiments.

However, in another example, all of the various processes described in the foregoing example embodiments may be executed by the server 6. In such a case, the control system 20 of each vehicle 100 may transmit information necessary for the processes to the server 6 via the terminal device 2 and the wireless base station 4, and receive a result of the processes from the server 6 via the wireless base station 4 and the terminal device 2. Further, on the basis of the received information, the control system 20 of each vehicle 100 may determine and control the travel of the vehicle 100.

In still another example, the server 6 may execute some of the various processes—including collecting the field information—described in the foregoing example embodiments, and the control system 20 of each vehicle 100 may execute the remaining processes. In that case, the server 6 may only have to collect the field information and transmitting the field information to the terminal devices 2 of the respective vehicles 100. The control system 20 of each vehicle 100 may perform mapping based on the field information, generate the information on the course or movable range of the own vehicle, and control the movement on the basis of the generated information.

In still another example, the control system 20 of each vehicle 100 may execute all of the various processes described in the foregoing example embodiments in place of the server 6. In that case, the processes executed by the server 6 in the foregoing example embodiments may be read as the processes executed by each vehicle 100. The server 6 may relay the information collected from the vehicles 100 to each of the vehicles 100. When relaying the field information, the server 6 may transmit necessary pieces of the field information to each vehicle 100, rather than uniformly transmitting the same field information to each vehicle 100. The necessary pieces of the field information may contain the field information on the other vehicles 100 traveling in a peripheral range of the own vehicle, for example. For instance, the server 6 may classify the field information on the other vehicles 100 traveling in a predetermined section or range according to the roads on which the other vehicles 100 are traveling, and transmit the classified field information to the respective vehicles 100. In still another example, the server may control at least one of the mobile bodies, and the least one of the mobile bodies may be only the vehicle of which the server takes charge.

In still another example, the server 6 may include a plurality of servers 6 distributed to the respective wireless base stations 4. The servers 6 may be distributed according to the stages of the processing, or may be distributed to respective regions so as to cover the respective areas of the wireless base stations 4. The servers 6 distributed to the respective wireless base stations 4 may be provided integrally with the respective wireless base stations 4. In that case, each of the distributed servers 6 may manage data routing of the corresponding wireless base station 4. For example, the distributed server 6 may process the data received from the vehicles 100 promptly and transmit the processed data to the respective vehicles 100. The wireless base station 4 provided with the distributed server 6 helps to minimize the transmission delay of the information. The wireless base station 4 provided with the distributed server 6 may serve as some of the components of the control system 20 of the vehicle 100. For example, the wireless base station 4 provided with the distributed server 6 may execute a part of the processing of the control system 20 of the vehicle 100 on behalf of the control system 20. The processing executed by the server 6 in the foregoing example embodiments may thus be achieved in a distributed manner by the plurality of wireless base stations 4 communicating with one another without via the server 6, for example. In that case, for example, each of the wireless base stations 4 dedicated to the corresponding road may classify the information on the vehicles 100 accommodated in the communication area according to the roads on the basis of the positions within the communication area. The wireless base station 4 may then group the classified pieces of information on the basis of the roads, and relay the grouped information to the other wireless base stations 4. In that case, another server 6 separate from the wireless base stations 4 may be omitted. Further, the processing executed by the server 6 in the foregoing example embodiments may be achieved in a distributed manner by the wireless base stations 4 and the servers 6 operating in cooperation with each other.

In still another example, the wireless base station 4 used together with the server 6 may be a general-purpose wireless base station capable of communicating with a mobile terminal or a wireless base station dedicated to the vehicle 100. For example, the wireless base station 4 of the foregoing example embodiments may be a base station for ADAS communication provided on a roadway. Further, the vehicle 100 may communicate with the base station or the server 6 through another vehicle 100 by, for example, a vehicle-to-vehicle (V2V) communication, rather than directly communicating with the base station or the server 6.

In any of the foregoing example embodiments, the mobility information provision system 1 may include the single server 6. Alternatively, the mobility information provision system 1 may include a plurality of servers 6, for example. The plurality of servers 6 may be assigned to different zones or overlapping zones including a wide area and a narrow area, for example. The servers 6 may be provided in a distributed manner in the mobility information provision system 1 involving a plurality of carriers. The servers 6 may perform processing for the respective zones and operate in cooperation with one another by exchanging the information. In the case of a malfunction of any of the servers 6, for example, another of the servers 6 may also perform processing for the zone of the server 6 occurring the malfunction. In these cases, the processing executed by the single server 6 in the foregoing example embodiments may be achieved by the plurality of servers 6. Further, the mobility information provision system 1 may be made redundant by an alternative server that is not used in normal cases.

The first example embodiment described above may be an application example of the technology based on the first example embodiment of Japanese Patent Application No. 2019-240029 filed prior to this application. The example disclosed in Japanese Patent Application No. 2019-240029 in which the processing of the server 6 is executed by the vehicle 100 is described in Japanese Patent Application No. 2019-240030. Additionally, the specification of Japanese Patent Application No. 2019-240031 discloses other examples of the mobility information provision system 1. The contents of these applications are incorporated by reference herein.

For example, the configuration and processing of the mobility information provision system 1 according to the first example embodiment of this application may be modified to those illustrated in FIGS. 12 to 19 of Japanese Patent Application No. 2019-240029. Even in that case, it is possible to obtain the effects of the technology by applying the contents of the foregoing example embodiments to the modified configuration and the modified processing of the mobility information provision system 1.

The term "time" used in the description of the mobility information provision system 1 may refer to a time when the vehicle 100 transmits information to the server 6, a time when the server 6 receives the information, a time when the server 6 transmits the processing result to the vehicle 100, a measurement time when the vehicle 100 receives the processing result, a predicted schedule time when the vehicle 100 passes by, or an actual traveling time when the vehicle 100 actually travels in a predicted section. In the case of a closed system, it is possible to shorten the time difference between the vehicle 100 and the server 6.

According to at least one example embodiment of the technology, the obstacle that would hinder the movement of mobile bodies is mapped together with the positions of the mobile bodies, and the information on the course or movable range that causes each of the mobile bodies to move avoiding the obstacle. Therefore, even if an obstacle is lying on the road or lane on which the mobile bodies are traveling, it is possible to move the mobile bodies while ensuring safety in accordance with the situation.

Each of the server CPU 14 illustrated in FIG. 2 and the control ECUs illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the server CPU 14 and the control ECUs. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the server CPU 14 illustrated in FIG. 2 and the control ECUs illustrated in FIG. 3.

The invention claimed is:

1. A mobility information provision system comprising:
a plurality of communication apparatuses provided in respective predetermined zones or respective predetermined sections of roads;
a server comprising:
a collector configured to collect, through one or more networks, field information or preliminary processed information using the plurality of communication apparatuses, the field information including information on movement of a plurality of mobile bodies, the preliminary processed information being obtained by processing the field information;
a mapping unit configured to map positions of the plurality of mobile bodies on a basis of the field information or the preliminary processed information collected by the collector; and
a generator configured to generate course-related information on a basis of information on the positions of the plurality of mobile bodies mapped by the mapping unit, the course-related information comprising information on courses or movable ranges in which the mobile bodies are movable; and
each of the plurality of mobile bodies including a controller configured to control movement of a corresponding one of the plurality of mobile bodies on a basis of the course-related information generated by the generator, information obtained from the course-related information and used to determine the movement of the corresponding one of the plurality of mobile bodies, or information used to control the movement of the corresponding one of the plurality of mobile bodies, wherein
the mapping unit is configured to map, in a case where the field information or the preliminary processed information collected by the collector includes information on an obstacle that would hinder the movement of the plurality of mobile bodies, the obstacle together with the positions of the plurality of mobile bodies,
the generator is configured to generate, in the case where the field information or the preliminary processed information collected by the collector includes the information on the obstacle that would hinder the movement of the plurality of mobile bodies, the course-related information for each of the plurality of mobile bodies to cause the plurality of mobile bodies to move avoiding the obstacle, the field information includes information on a time at a position of a mobile body of the plurality of mobile bodies, information on the position and information on a speed of the mobile body, and the collector is configured to:
  determine, based on the field information, that a difference between the time of the field information and a time obtained from a radio wave of a satellite at the position of the mobile body is equal to or greater than a threshold;
  in response to determining that the difference is equal to or greater than the threshold, determine that the time of the field information is not accurate; and
  correct, based on determining that the time of the field information is not accurate, the information on the time, the information on the position, and the information on the speed of the field information.

2. The mobility information provision system according to claim 1, further comprising a plurality of terminal devices usable in the plurality of mobile bodies, respectively, wherein
  each of the plurality of communication apparatuses provided in the respective predetermined zones or the respective predetermined sections in which the plurality of mobile bodies are to move is configured to communicate with a corresponding one of the plurality of terminal devices used in a mobile body moving in the predetermined zone or the predetermined section of which the communication apparatus is in charge, among the plurality of mobile bodies.

3. The mobility information provision system according to claim 2, wherein:
  each of the plurality of mobile bodies comprises a vehicle, and
  the controller is provided in the vehicle.

4. The mobility information provision system according to claim 2, wherein:
  the mapping unit is configured to map a position of the obstacle, and
  the generator is configured to generate, on a basis of information on the positions of the plurality of mobile bodies and the position of the obstacle that are mapped by the mapping unit, the course-related information for a mobile body to move avoiding the position of the obstacle or pass by the position of the obstacle at a decelerating speed, among the plurality of mobile bodies.

5. The mobility information provision system according to claim 2, wherein:
  the mapping unit is configured to set a warning section or a prohibited section around the position of the obstacle, and
  the generator is configured to generate the course-related information for a mobile body to move avoiding the warning section or the prohibited section set around the position of the obstacle, among the plurality of mobile bodies.

6. The mobility information provision system according to claim 5, wherein:
  the obstacle includes at least one of a fallen object or an animal, and
  the mapping unit is configured to
  determine whether there is a likelihood of movement of the position of the obstacle, and
  make the warning section larger in a case where there is the likelihood of the movement of the position of the obstacle than in a case where there is no likelihood of the movement of the position of the obstacle, or make the warning section larger in a case where the likelihood of the movement of the position of the obstacle is equal to or higher than a predetermined threshold than in a case where the likelihood of the movement of the position of the obstacle is lower than the predetermined threshold.

7. The mobility information provision system according to claim 2, wherein
  the mapping unit is configured to, in response to identifying a point or a section that have been avoided by vehicles based on past map data, map a virtual obstacle at the point or the section.

8. The mobility information provision system according to claim 1, wherein:
  each of the plurality of mobile bodies comprises a vehicle, and
  the controller is provided in the vehicle.

9. The mobility information provision system according to claim 1, wherein:
  the mapping unit is configured to map a position of the obstacle, and
  the generator is configured to generate, on a basis of information on the positions of the plurality of mobile bodies and the position of the obstacle that are mapped by the mapping unit, the course-related information for a mobile body to move avoiding the position of the obstacle or pass by the position of the obstacle at a decelerating speed, among the plurality of mobile bodies.

10. The mobility information provision system according to claim 1, wherein:
  the mapping unit is configured to set a warning section or a prohibited section around the position of the obstacle, and
  the generator is configured to generate the course-related information for a mobile body to move avoiding the warning section or the prohibited section set around the position of the obstacle, among the plurality of mobile bodies.

11. The mobility information provision system according to claim 10, wherein:
  the obstacle includes at least one of a fallen object or an animal, and
  the mapping unit is configured to
  determine whether there is a likelihood of movement of the position of the obstacle, and
  make the warning section larger in a case where there is the likelihood of the movement of the position of the obstacle than in a case where there is no likelihood of the movement of the position of the obstacle, or make the warning section larger in a case where the likelihood of the movement of the position of the obstacle is equal to or higher than a predetermined threshold than in a case where the likelihood of the movement of the position of the obstacle is lower than the predetermined threshold.

12. The mobility information provision system according to claim 11, wherein
  the generator is configured to generate the course-related information for each of the plurality of mobile bodies to cause each of the plurality of mobile bodies to avoid the obstacle, the warning section, or the prohibited section in a different way depending on a moving state or a moving environment of each of the plurality of mobile bodies.

13. The mobility information provision system according to claim 10, wherein
the generator is configured to generate the course-related information for each of the plurality of mobile bodies to cause each of the plurality of mobile bodies to avoid the obstacle, the warning section, or the prohibited section in a different way depending on a moving state or a moving environment of each of the plurality of mobile bodies.

14. The mobility information provision system according to claim 1, wherein
the mapping unit is configured to, in response to identifying a point or a section that have been avoided by vehicles based on past map data, map a virtual obstacle at the point or the section.

15. The mobility information provision system according to claim 1, wherein:
the mapping unit is configured to generate information on diagrams, each of the diagrams corresponding to a single lane road or a single lane of a multi-lane road based on the field information or the preliminary processed information,
each of the diagrams includes: a first axis representing time;
a second axis being perpendicular to the first axis and representing positions along the single lane road or the single lane of the multi-lane road; and a region defined by the first axis and the second axis,
the mapping unit is configured to:
map, when a mobile body included in the plurality of mobile bodies and traveling the single lane road or the single lane of the multi-lane road is detected, at least a current position and a predicted position of the mobile body onto the region; and
map, when the obstacle being on the single lane road or the single lane of the multi-lane road is detected or is predicted, a position of the obstacle onto the region, and
the generator is configured to generate the course-related information based on the diagrams, the course-related information including information on a course or a movable range for causing the mobile body to travel with avoiding the obstacle.

16. A server for a mobility information provision system, the server including:
a collector configured to collect, through one or more networks, field information or preliminary processed information using a plurality of communication apparatuses provided in respective predetermined zones or respective predetermined sections of roads, the field information including information on movement of a plurality of mobile bodies, the preliminary processed information being obtained by processing the field information;
a mapping unit configured to map positions of the plurality of mobile bodies on a basis of the field information or the preliminary processed information collected by the collector;
a generator configured to generate course-related information on a basis of information on the positions of the plurality of mobile bodies mapped by the mapping unit, the course-related information comprising information on courses or movable ranges in which the plurality of mobile bodies are movable; and
a transmitter configured to transmit the information on the courses or the movable ranges to the plurality of mobile bodies, wherein the mapping unit is configured to map, in a case where the field information or the preliminary processed information collected by the collector includes information on an obstacle that would hinder the movement of the plurality of mobile bodies, the obstacle together with the positions of the plurality of mobile bodies,
the generator is configured to generate, in the case where the field information or the preliminary processed information collected by the collector includes the information on the obstacle that would hinder the movement of the plurality of mobile bodies, the course-related information for each of the plurality of mobile bodies to cause the plurality of mobile bodies to move avoiding the obstacle,
the field information includes information on a time at a position of a mobile body of the plurality of mobile bodies, information on the position and information on a speed of the mobile body, and
the collector is configured to:
determine, based on the field information, that a difference between the time of the field information and a time obtained from a radio wave of a satellite at the position of the mobile body is equal to or greater than a threshold;
in response to determining that the difference is equal to or greater than the threshold, determine that the time of the field information is not accurate; and
correct, based on determining that the time of the field information is not accurate, the information on the time, the information on the position, and the information on the speed of the field information.

17. The server according to claim 16, wherein:
the mapping unit is configured to generate information on diagrams, each of the diagrams corresponding to a single lane road or a single lane of a multi-lane road based on the field information or the preliminary processed information,
each of the diagrams includes: a first axis representing time;
a second axis being perpendicular to the first axis and representing positions along the single lane road or the single lane of the multi-lane road; and a region defined by the first axis and the second axis,
the mapping unit is configured to:
map, when a mobile body included in the plurality of mobile bodies and traveling the single lane road or the single lane of the multi-lane road is detected, at least a current position and a predicted position of the mobile body onto the region; and
map, when the obstacle being on the single lane road or the single lane of the multi-lane road is detected or is predicted, a position of the obstacle onto the region, and
the generator is configured to generate the course-related information based on the diagrams, the course-related information including information on a course or a movable range for causing the mobile body to travel with avoiding the obstacle.

18. A vehicle for a mobility information provision system, the vehicle including
a collector configured to collect field information or preliminary processed information using a plurality of communication apparatuses provided in respective predetermined zones or respective predetermined sections of roads, the field information including information on movement of a plurality of mobile bodies, the preliminary processed information being obtained by processing the field information;

a mapping unit configured to map positions of the plurality of mobile bodies on a basis of the field information or the preliminary processed information collected by the collector;

a generator configured to generate course-related information on a basis of information on the positions of the plurality of mobile bodies mapped by the mapping unit, the course-related information comprising information on courses or movable ranges in which the plurality of mobile bodies are movable; and a controller configured to control movement of the vehicle on a basis of the course-related information generated by the generator, information obtained from the course-related information and used to determine the movement of the vehicle, or information used to control the movement of the vehicle, wherein the mapping unit is configured to map, in a case where the field information or the preliminary processed information collected by the collector includes information on an obstacle that would hinder the movement of the plurality of mobile bodies, the obstacle together with the positions of the plurality of mobile bodies, the generator is configured to generate, in the case where the field information or the preliminary processed information collected by the collector includes the information on the obstacle that would hinder the movement of the plurality of mobile bodies, the course-related information for each of the plurality of mobile bodies to cause the plurality of mobile bodies to move avoiding the obstacle, the field information includes information on a time at a position of a mobile body of the plurality of mobile bodies, information on the position and information on a speed of the mobile body, and the collector is configured to:
  determine, based on the field information, that a difference between the time of the field information and a time obtained from a radio wave of a satellite at the position of the mobile body is equal to or greater than a threshold;
  in response to determining that the difference is equal to or greater than the threshold, determine that the time of the field information is not accurate; and
  correct, based on determining that the time of the field information is not accurate, the information on the time, the information on the position, and the information on the speed of the field information.

19. The vehicle according to claim 18, wherein:

the mapping unit is configured to generate information on diagrams, each of the diagrams corresponding to a single lane road or a single lane of a multi-lane road based on the field information or the preliminary processed information, each of the diagrams includes: a first axis representing time;

a second axis being perpendicular to the first axis and representing positions along the single lane road or the single lane of the multi-lane road; and a region defined by the first axis and the second axis, the mapping unit is configured to:
  map, when a mobile body included in the plurality of mobile bodies and traveling the single lane road or the single lane of the multi-lane road is detected, at least a current position and a predicted position of the mobile body onto the region; and
  map, when the obstacle being on the single lane road or the single lane of the multi-lane road is detected or is predicted, a position of the obstacle onto the region, and the generator is configured to generate the course-related information based on the diagrams, the course-related information including information on a course or a movable range for causing the mobile body to travel with avoiding the obstacle.

* * * * *